(12) United States Patent
Choe et al.

(10) Patent No.: US 9,582,000 B2
(45) Date of Patent: Feb. 28, 2017

(54) ROBOT CLEANER, AND SYSTEM AND METHOD FOR REMOTELY CONTROLLING THE SAME

(75) Inventors: Suuk Choe, Changwon-Si (KR); Sunghun Lee, Changwon-Si (KR); Junho Jang, Changwon-Si (KR); Seungmin Baek, Changwon-Si (KR); Yiebin Kim, Changwon-Si (KR)

(73) Assignee: LG ELECTRONICS INC., Seoul (KR)

( * ) Notice: Subject to any disclaimer, the term of this patent is extended or adjusted under 35 U.S.C. 154(b) by 954 days.

(21) Appl. No.: 13/605,469

(22) Filed: Sep. 6, 2012

(65) Prior Publication Data

US 2013/0056032 A1    Mar. 7, 2013

(30) Foreign Application Priority Data

Sep. 7, 2011  (KR) .................. 10-2011-0090867
Sep. 7, 2011  (KR) .................. 10-2011-0090886

(51) Int. Cl.
*G05D 1/00*     (2006.01)
*A47L 9/04*     (2006.01)
*A47L 9/28*     (2006.01)

(52) U.S. Cl.
CPC .......... *G05D 1/0038* (2013.01); *A47L 9/0488* (2013.01); *A47L 9/2805* (2013.01); *A47L 9/2857* (2013.01); *G05D 1/0044* (2013.01); *A47L 2201/04* (2013.01); *G05D 2201/0203* (2013.01)

(58) Field of Classification Search
CPC .. A47L 2201/00; A47L 2201/04; A47L 9/009; A47L 9/2805; A47L 9/2842; A47L 9/2857; A47L 9/2852; A47L 9/2889
See application file for complete search history.

(56) References Cited

U.S. PATENT DOCUMENTS

| | | | | |
|---|---|---|---|---|
| 2004/0083570 | A1* | 5/2004 | Song .................. | A47L 9/009 15/319 |
| 2008/0184518 | A1* | 8/2008 | Taylor ................ | A47L 9/009 15/319 |
| 2010/0085384 | A1* | 4/2010 | Kim .................... | G06F 3/0488 345/660 |

FOREIGN PATENT DOCUMENTS

| | | | |
|---|---|---|---|
| JP | 2006-003263 | A | 5/2006 |
| KR | 10-0725516 | | 10/2002 |
| KR | 10-2004-0003088 | A | 1/2004 |
| KR | 20-0414637 | Y1 | 4/2006 |
| KR | 10-2007-0031826 | * | 3/2007 |
| KR | 10-2007-0102197 | A | 10/2007 |
| KR | 10-0821162 | B1 | 4/2008 |
| KR | 10-2011-0018211 | A | 2/2011 |

* cited by examiner

*Primary Examiner* — Robert Scruggs
(74) *Attorney, Agent, or Firm* — Dentons US LLP

(57) ABSTRACT

A robot cleaner is accessed to a terminal through a network. A situation inside a house can be real-time checked from the outside, and the situation can be rapidly handled according to a state of the robot cleaner. The robot cleaner can patrol a predetermined region or move to a user's desired location, and can provide, to the user through the terminal, images captured on a moving path or the user's desired location. The robot cleaner can provide image information captured during the cleaning to the terminal. And, the terminal can video-record the image information.

8 Claims, 39 Drawing Sheets

ROBOT CLEANER, AND SYSTEM AND METHOD FOR REMOTELY CONTROLLING THE SAME

CROSS-REFERENCE TO RELATED APPLICATION

Pursuant to 35 U.S.C. §119(a), this application claims the benefit of earlier filing date and right of priority to Korean Applications No. 10-2011-0090867, filed on Sep. 7, 2011 and No. 10-2011-0090886, filed on Sep. 7, 2011, the contents of which is incorporated by reference herein in its entirety.

BACKGROUND OF THE DISCLOSURE

1. Field of the Disclosure

The present disclosure relates to a remotely-controllable robot cleaner, and particularly, to a terminal for remotely-controlling a robot cleaner, and a system and method for remotely-controlling the same.

2. Background of the Disclosure

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials while autonomously moving on a predetermined region. This robot cleaner is provided with a chargeable battery, and is provided with an obstacle sensor for avoiding an obstacle while moving.

The robot cleaner is controlled by using a remote controller (a user interface), buttons provided at a cleaner body, etc. Nowadays, a robot cleaner capable of recognizing a self position and creating a map using a camera or each type of sensors, is being developed.

SUMMARY OF THE DISCLOSURE

Therefore, an aspect of the detailed description is to provide a robot cleaner remotely-controlled by a terminal.

Another aspect of the detailed description is to provide a robot cleaner capable of performing a cleaning operation by a cleaning command of a terminal, and capable of providing image information while moving or performing a cleaning operation.

Still another aspect of the detailed description is to provide a terminal capable of remotely-controlling a robot cleaner, capable of performing a video-recording or monitoring with respect to the periphery of the robot cleaner, and capable of real-time checking a state of the robot cleaner.

Yet still another aspect of the detailed description is to provide a remote-controlling system and method including a robot cleaner and a terminal, and capable of remotely-controlling the robot cleaner, capable of performing a video-recording or monitoring with respect to the periphery of the robot cleaner, and capable of real-time checking a state of the robot cleaner.

To achieve these and other advantages and in accordance with the purpose of this specification, as embodied and broadly described herein, there is provided a robot cleaner, comprising: an image detection unit configured to create image information by capturing the periphery; a communication unit configured to receive a control signal from an external terminal, and to transmit the image information to the terminal; a driving unit having one or more wheels, and configured to drive the wheels by a driving signal; and a control unit configured to extract a control command from the control signal, and configured to control the image detection unit and the driving unit based on the control command.

The control command may include a moving command for moving the robot cleaner. And, the control unit may be configured to extract the moving command from the control signal, and to control the robot cleaner to move along a moving path, by generating the driving signal from the moving command.

The moving path may be a patrol path connected to the current position of the robot cleaner, and the moving command may include a patrol command for moving the robot cleaner along the patrol path.

The control unit may be configured to control the image detection unit to continuously create image information for a predetermined time.

To achieve these and other advantages and in accordance with the purpose of this specification, as embodied and broadly described herein, there is also provided a system for remotely-controlling a robot cleaner, the system comprising: a robot cleaner configured to perform a control command by extracting the control command from a control signal, to move along a moving path based on the control command, and to create image information by capturing the periphery; and a terminal configured to control the robot cleaner using the control signal, configured to receive one or more data including the image information from the robot cleaner, and to output the received data.

The terminal may include a radio communication unit configured to transmit the control signal to the robot cleaner by accessing the robot cleaner, and to receive the data from the robot cleaner; a controller configured to create the control signal corresponding to the control command, and to create a control screen using the data; a display unit having a touch recognition region for receiving an input of the control command, and configured to display the control screen; and a memory configured to store the data therein.

The touch recognition region may include a first region having a preset size, on which the control screen is displayed and the control command is input; and a second region having a size equal to or larger than the size of the first region.

To achieve these and other advantages and in accordance with the purpose of this specification, as embodied and broadly described herein, there is still also provided a method for remotely-controlling a robot cleaner, the method comprising: a robot cleaner's receiving a control signal from a terminal; the robot cleaner's extracting a control command from the control signal; the robot cleaner's executing the control command and moving along a moving path; the robot cleaner's creating image information by capturing the periphery; the robot cleaner's transmitting one or more data including the image information to the terminal; and the terminal's displaying the data on a screen.

The robot cleaner may be provided with a remote-controlling communication means mounted therein, such that it is easily controlled from the outside by a terminal such as a mobile terminal.

The robot cleaner may patrol a predetermined region, or may move to a position desired by a user, etc. The robot cleaner may provide, through a terminal, an image about a moving path or a position desired by a user, etc. And, the robot cleaner may include a light configured to provide an image of high quality, irrespective of the peripheral circumstances.

The robot cleaner may perform a charging operation by real-time checking a state of a battery, while patrolling, moving or performing a cleaning operation. And, the robot cleaner may real-time transmit state information to the terminal, such that a user easily checks a state of the robot cleaner by using the terminal.

The robot cleaner may perform automatic cleaning, manual cleaning and reservation cleaning, in an autonomous manner or in a remote-controlled manner. And, the robot cleaner may provide an image about the periphery to the terminal while performing a cleaning operation or moving, and may move to a position desired by a user, etc. thus to provide a peripheral situation to the user.

The terminal may easily remote-control the robot cleaner by executing a remote control program, and may allow a user, etc. to real-time check a state of the robot cleaner or a peripheral situation.

In the system and method for remote-controlling a robot cleaner, the robot cleaner may be controlled in various manners, as the robot cleaner and the terminal are accessed to each other through a network.

In the system and method for remote-controlling a robot cleaner, a situation inside a house may be real-time checked from the outside, and the situation may be rapidly controlled according to a state of the robot cleaner.

The present disclosure may enhance a user's convenience, and improve operation efficiency and stability of the robot cleaner.

Furthermore, when a user accesses the robot cleaner through the terminal, the robot cleaner may perform an access authentication operation. This may prevent misuse of the robot cleaner.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 5:
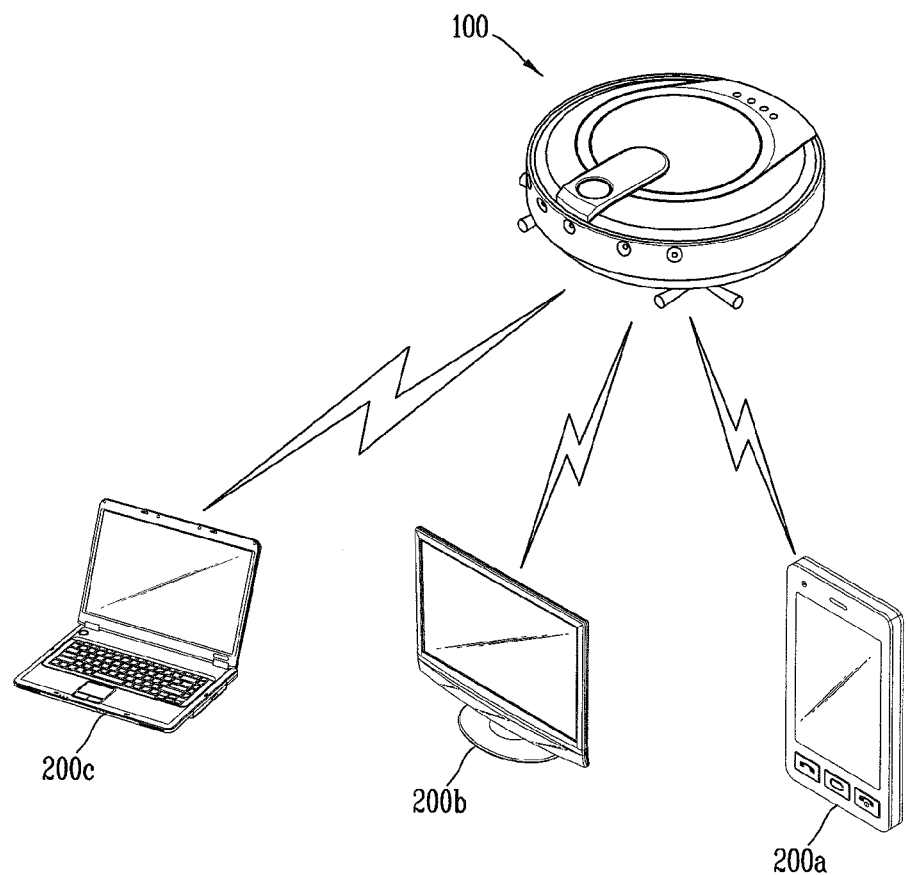
FIG. 5 is a view schematically showing a remote control system for a robot cleaner according to an embodiment.

Referring to FIG. 5, a system for remotely-controlling a robot cleaner includes a robot cleaner 100 configured to perform a control command by extracting the control command from a control signal, to move along a moving path based on the control command, and to create image information by capturing the periphery; and a terminal 200 configured to control the robot cleaner using the control signal, configured to receive one or more data including the image information from the robot cleaner, and to output the received data. The moving path indicates a path based on a moving command for instructing the robot cleaner to move to another position from the current position or a predetermined position. Alternatively, the moving path may be a patrol path that a starting position and an ending position of the robot cleaner are the same. The moving command may be a patrol command for instructing the robot cleaner to move along a patrol path. And, the robot cleaner transmits image information to the terminal while performing the patrol command.

Generally, the terminal is categorized into a mobile/portable terminal and a stationary terminal according to a movable state. In the present disclosure, the terminal includes the mobile terminal and the stationary terminal. Also, the terminal is categorized into a handheld terminal and a vehicle mount terminal according to a user's portable state. For instance, the terminal includes a cell-phone (PCS phone), a smart phone, a notebook (laptop computer), a digital broadcasting terminal, Personal Digital Assistants (PDA), a Portable Multimedia Player (PMP), a navigation system, etc. A remote controlling system may have a different network scheme according to a type of the terminal. For instance, in case of a cell-phone or a smart phone, the remote controlling system may use a mobile communication network such as 3G, CDMA and WCDMA. In this case, the robot cleaner and the terminal transmit or receive radio signals to/from a base station, an external terminal, a server, etc. on a mobile communication network.

Figure 1:
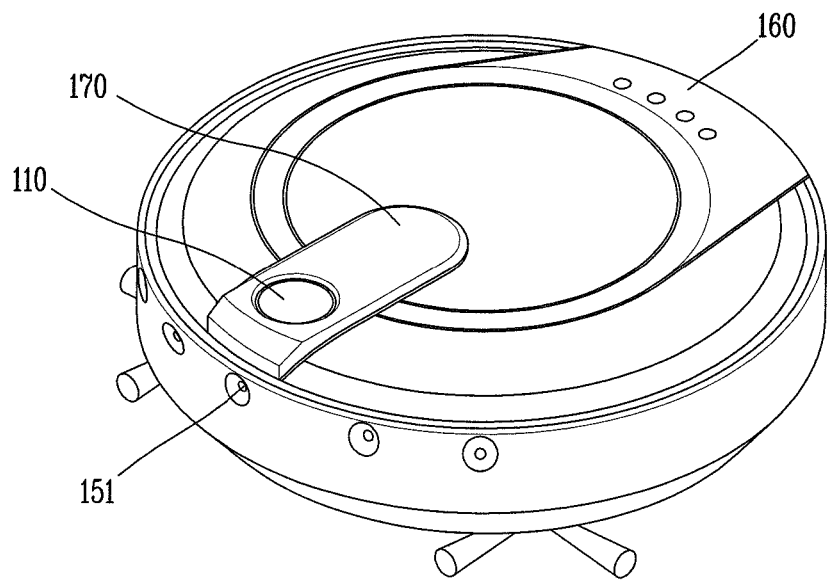
FIG. 1 is a perspective view showing the appearance of a robot cleaner according to embodiments of the present disclosure.
Figure 2:
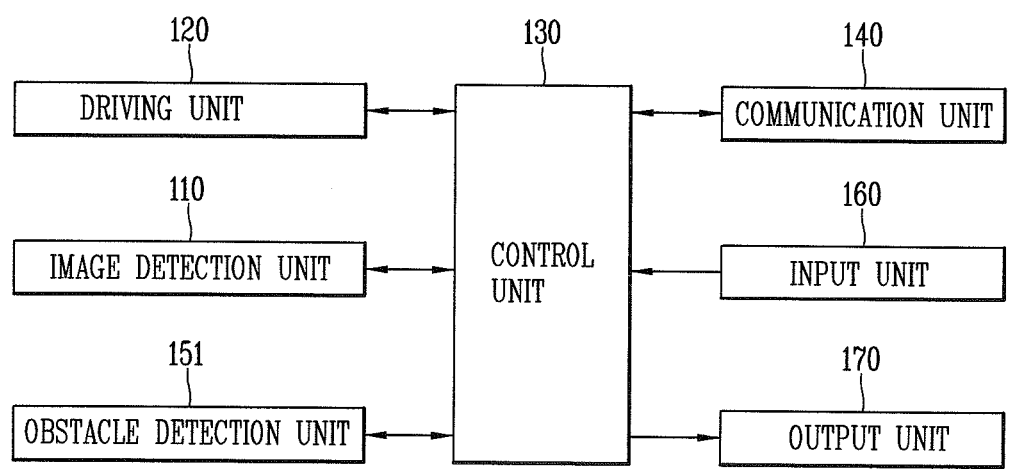
FIGS. 2 and 3 are block diagrams showing a detailed configuration of a robot cleaner according to embodiments of the present disclosure.

Referring to FIGS. 1 and 2, the robot cleaner 100 according to an embodiment of the present disclosure comprises an image detection unit 110, a driving unit 120, and a control unit 130. The image detection unit 110 is configured to create image information by capturing the periphery. The driving unit 120 has one or more wheels, and is configured to drive the wheels by a driving signal. And, the control unit 130 is configured to extract a control command from a control signal, and is configured to control the image detection unit 110 and the driving unit 120 based on the control command.

The robot cleaner 100 further comprises a communication unit 140 configured to receive a control signal from an external terminal 200, and to transmit the image information to the terminal 200. The control command includes a moving command for moving the robot cleaner. The control unit 130 is configured to extract a moving command from the control signal, and to create a driving signal based on the moving command so that the robot cleaner can move along a moving path.

The communication unit 140 is accessed to the terminal through a communication method among currently-available communication methods including a wired communication method, a radio communication method and a satellite communication method, thereby exchanging signals and data with the terminal. The communication unit 140 receives a control signal from the terminal, and transmits state information of the robot cleaner, obstacle information, position information, image information, a map, etc. Furthermore, the communication unit 140 may perform communication with the terminal, using one of short range radio communications including a radio frequency (RF) communication, Bluetooth, an infrared ray communication (IrDA), a wireless LAN, zigbee, etc. For instance, if the terminal is a smart phone, the robot cleaner may be further provided with a communication unit according to a communication method which can be used by the smart phone.

The image detection unit 110 is installed towards the upper side or the front side. The image detection unit 110 is provided with an upper camera sensor, and is configured to detect image information by capturing the periphery of the robot cleaner. If the image detection unit 110 is provided with a plurality of upper camera sensors, the camera sensors may be formed on the upper surface or the side surface of the robot cleaner, at constant intervals or at constant angles. The image detection unit 110 may be used as another type of position recognition unit.

The control unit 130 is configured to extract a control command from a control signal, and to control the image detection unit 110 based on the control command. The control unit 130 is configured to control the image detection unit 110 to continuously create image information for a predetermined time.

The terminal 200 is configured to perform video-recording with respect to image information transmitted from the robot cleaner, for a predetermined time. The control unit 130 is configured to extract a cleaning command from a control signal, and to perform a cleaning operation based on the cleaning command. And, the control unit 130 may divide a region on a map into a cleaned region and a non-cleaned region.

Figure 3:
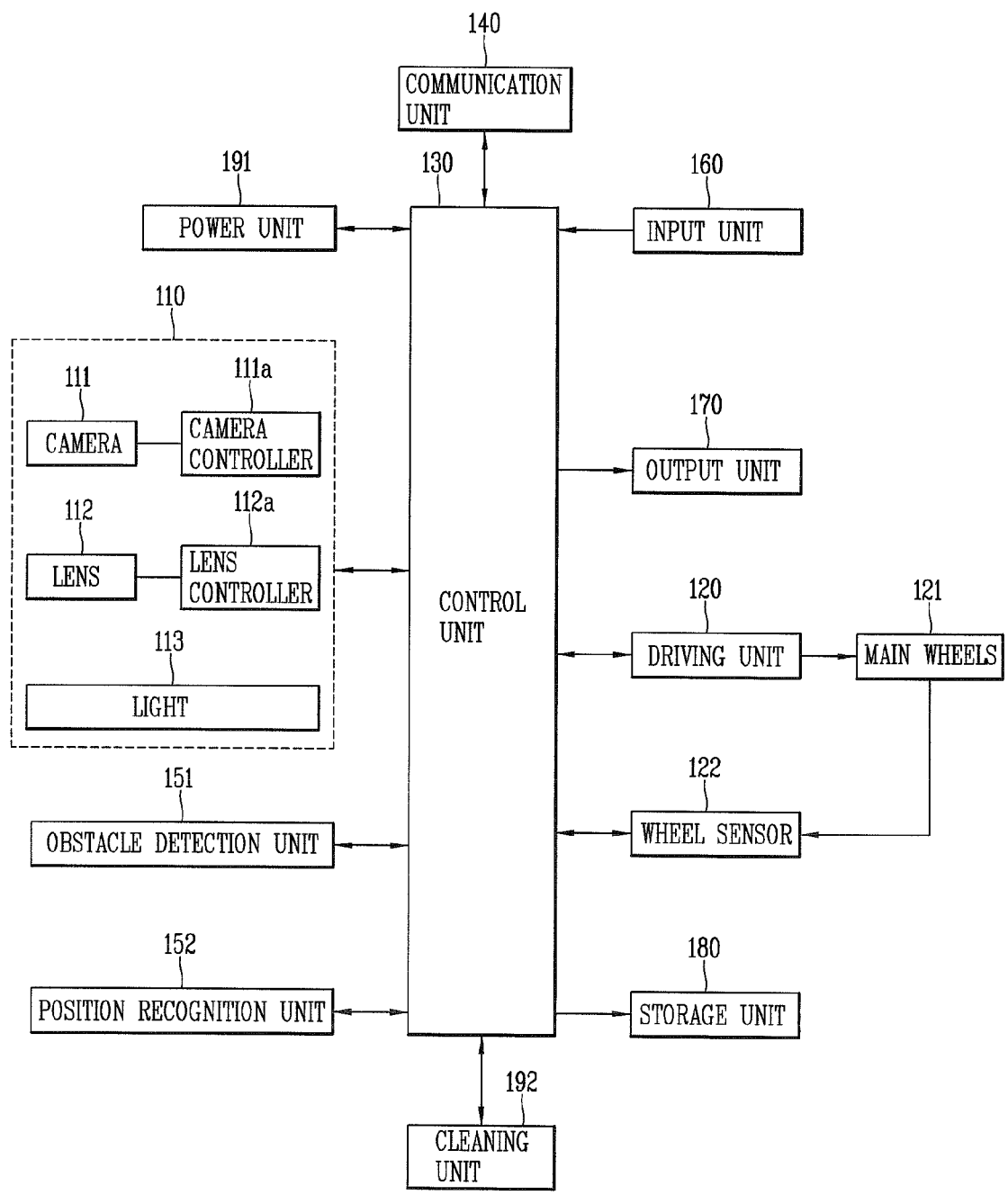

Referring to FIG. 3, the image detection unit 110 may include a camera 111 configured to capture a subject, a lens 112 connected to the camera 111 and focusing the camera on the subject, a camera controller 111a configured to control the camera 111, and a lens controller configured to control the lens 112. As the lens, preferably used is a lens having a wide view angle so that all the peripheral regions, e.g., all the regions on the ceiling may be captured at a predetermined position. Image information is consecutively transmitted to the terminal for a predetermined time according to the terminal's request. The control unit 130 may extract feature points from the image information captured by the image detection unit. Then, the control unit 130 may recognize the position of the robot cleaner based on the feature points, and may create a map with respect to a cleaning region.

The image detection unit 110 may further include a light 113 configured to control the brightness of the periphery. The light 113 may be automatically controlled according to intensity of illumination of the periphery. Also, the light 113 may be controlled to be turned on or off according to a control command of the terminal, i.e., a command for turning on or off power of the light 113.

The robot cleaner is provided with right and left main wheels at two lower sides thereof. A handgrip may be installed at two side surfaces of the wheels, for facilitation of a user's grasp.

Referring to FIG. 3, the driving unit 120 is provided with wheel motors connected to the right and left main wheels 121, and configured to rotate the wheels. As the wheel motors are driven by the driving unit 120, the robot cleaner is moved. The wheel motors are connected to the main wheels, respectively thus to rotate the main wheels, and can be rotated in two directions in an independent manner. And, the robot cleaner is provided with one or more auxiliary wheels on the rear surface thereof. The auxiliary wheels serve to support a body, to minimize friction between a lower surface of the body and the bottom surface (surface to be cleaned), and to allow the robot cleaner to smoothly move.

Referring to FIG. 2 or 3, the robot cleaner further includes an obstacle detection unit 151 having one or more sensors, and configured to detect peripheral obstacles using detection signals of the sensors, and to output obstacle information. The control unit 130 creates a map based on the obstacle information.

As shown in FIG. 1, the obstacle detection unit 151 includes first sensors installed on a front circumferential surface of the robot cleaner at constant intervals. And, the obstacle detection unit 151 may include second sensors protruding towards the outside of the body. Positions and types of the first and second sensors may be variable according to a type of the robot cleaner, and the obstacle detection unit may include various sensors. The first sensor is configured to detect an object which exists in a moving direction of the robot cleaner, i.e. an obstacle, and then transmits obstacle information to the control unit 130. That is, the first sensor detects protrusions, appliances, furniture, wall surfaces, wall corners, etc. which exist on a moving path of the robot cleaner, and then transmits obstacle information to the control unit. The first sensor may be implemented as an infrared ray sensor, an ultrasonic sensor, an RF sensor, a geomagnetic sensor, etc. And, the second sensor detects an obstacle which exists at the front or lateral side, and transmits obstacle information to the control unit. That is, the second sensor detects protrusions, appliances, furniture, wall surfaces, wall corners, etc. which exist on a moving path of the robot cleaner, and then transmits obstacle information to the control unit. The second sensor may be implemented as an infrared ray sensor, an ultrasonic sensor, an RF sensor, a position sensitive device (PSD) sensor, etc.

The obstacle detection unit 151 may further include a cliff sensor installed at the bottom surface of the body, and configured to detect an obstacle which is on the floor, e.g., a cliff. The cliff sensor is configured to obtain stable measurement values regardless of reflectivity of the floor and a color difference. Like the PSD sensor, the cliff sensor may be implemented in the form of an infrared ray module.

Figure 4:
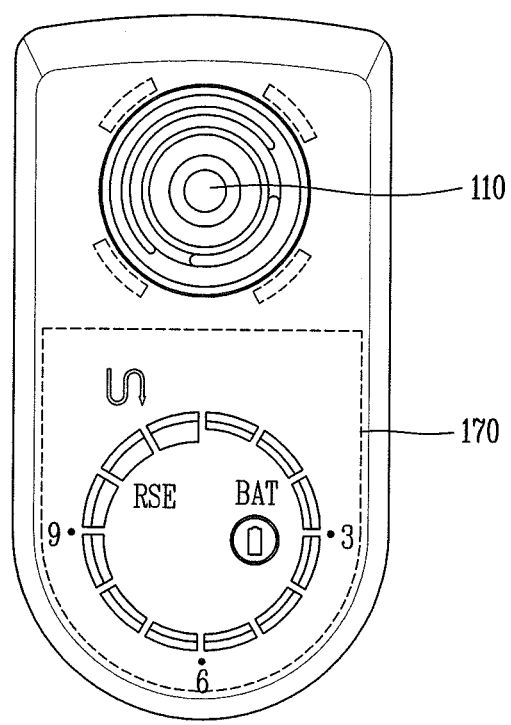
FIG. 4 is an enlarged view of an output unit of a robot cleaner according to an embodiment.

The obstacle detection unit 151 may further include a charging signal sensor configured to receive a guide signal transmitted from a charging station. The robot cleaner receives a guide signal transmitted from the charging station using the charging signals sensor, thereby checking a position and a direction of the charging station. The charging station creates a guide signal indicating a direction and a distance so that the robot cleaner can return to the charging station. The robot cleaner receives the guide signal transmitted from the charging station, and determines the current position and sets a moving direction. Then, the robot cleaner returns to the charging station. The charging signal sensor may be implemented as an infrared ray sensor, an ultrasonic sensor, a radio frequency (RF) sensor, etc, and may be generally used as an infrared ray sensor. The charging signal sensor is provided at an inner or outer side of the robot cleaner. For instance, as shown in FIG. 4, the charging signal sensor may be installed below an output unit 170, or at the periphery of the image detection unit 110.

Referring to FIG. 3, the robot cleaner further includes a position recognition unit 152 having one or more sensors, and configured to recognize the position of the robot cleaner using detection signals of the sensors, and configured to output position information. The control unit 130 corrects a map using the position information output from the position recognition unit 152.

The position recognition unit 152 includes a lower camera sensor provided on the rear surface of the robot cleaner, and configured to capture the floor (i.e., a surface to be cleaned) while the robot cleaner moves. The lower camera sensor is called an 'optical flow sensor', and converts a lower side image inputted from an image sensor provided therein thus to create a predetermine type of image data. The lower camera data may detect the position of the robot cleaner regardless of sliding of the robot cleaner. The control unit 130 real-time compares image data captured by the lower camera sensor to each other, thus to calculate a moving distance and a moving direction, thereby calculating the position of the robot cleaner. As the lower side of the robot cleaner is observed by the lower camera sensor, the control unit can compensate for an error due to sliding of the robot cleaner, the sliding occurred at a position calculated by other means.

The position recognition unit 152 further includes an acceleration sensor configured to sense a change of a moving speed, due to start, stop, direction conversion, collision with an object, etc. The acceleration sensor may be attached to a region close to the main wheels or the auxiliary wheels, and may be sense sliding or idle rotation of the wheels. A moving speed of the robot cleaner may be calculated based on an acceleration sensed by the acceleration sensor, and the calculated moving speed is compared with a reference speed, thereby checking or compensating for the position of the robot cleaner. However, the acceleration sensor is generally mounted in the control unit 130, and senses a speed change of the robot cleaner occurring in a cleaning mode or a running mode. That is, the acceleration sensor senses an impact amount due to a speed change, and outputs a voltage corresponding to the impact amount. Accordingly, the acceleration sensor may perform functions of an electronic bumper.

The position recognition unit 152 further includes a gyro sensor configured to sense a rotation direction and a rotation angle when the robot cleaner moves, patrols and cleans. The gyro sensor senses an angular speed of the robot cleaner, and outputs a voltage proportional to the angular speed. The control unit 130 calculates a rotation direction and a rotation angle of the robot cleaner based on the voltage outputted from the gyro sensor.

As shown in FIG. 3, the position recognition unit 152 may further include wheel sensors 122 connected to the right and left main wheels 121, and sensing RPMs of the right and left main wheels 121. The wheel sensors 122 may be implemented as a rotary encoder. When the robot cleaner moves in a running mode or a cleaning mode, the rotary encoder senses RPMs of the right and left main wheels, and outputs the sensed RPMs. The control unit 130 may calculate rotation speeds of the right and left main wheels based on the sensed RPMs.

The control unit 130 may precisely recognize the position of the robot cleaner based on detection information sensed by the acceleration sensor, the gyro sensor, the wheel sensor and the lower camera sensor, and image information obtained by the image detection unit. And, the control unit 130 may create a precise map based on a position of the robot cleaner, the position recognized based on obstacle information obtained by the obstacle detection unit, and image information obtained by the image detection unit. The communication unit 140 transmits, to the terminal, data including image information, obstacle information, position information, a map, a cleaning region, etc.

Referring to FIG. 2 or 3, the robot cleaner further includes an input unit 160 through which a user directly inputs a control command to the robot cleaner. The user may input, through the input unit 300, a command instructing an output of one or more information among information stored in a storage unit. The input unit 160 may be implemented as one or more buttons. For instance, the input unit 160 may include an OK button and a set button. The OK button is used to input a command for certifying obstacle information, position information, image information, a cleaning region, a map, a cleaning path, a moving path, a patrolling path, etc. The set button is used to input a command for setting such information. The input unit may be provided with a reset button for inputting a command for resetting such information, a deletion button, a cleaning start button, a stop button, etc. As another example, the input unit 160 may be provided with a button for setting reservation information, or a button for deleting reservation information. The input unit 160 may be further provided with a button for setting a cleaning mode, or a button for changing a cleaning mode. The input unit 160 may be further provided with a button for inputting a command instructing the robot cleaner to return to a charging station. As shown in FIG. 1, the input unit 160 may be installed at an upper part of the robot cleaner, in the form of hard or soft keys, a touch pad, etc. The input unit 160 may be implemented in the form of a touch screen together with the output unit 170.

As shown in FIG. 1, the output unit 170 is installed at an upper part of the robot cleaner. However, the installation position may be variable. For instance, the output unit 170 outputs, to a screen, reservation information, a battery state, intensive cleaning, space extension, a cleaning or running operation in a zigzag form, etc. The output unit 170 may output the current cleaning state of the robot cleaner, and the current state of each unit of the robot cleaner. The output unit 170 may display, on a screen, obstacle information, position information, image information, a map, a cleaning region, a cleaning path, a moving path, a patrolling path, etc. The output unit 170 may be implemented as one of a light emitting diode (LED), a liquid crystal display (LCD), a plasma display panel (PDP), and an organic light emitting diode (OLED). The output unit 170 may be further configured to display, on the screen, the remaining amount of a battery. And, the terminal 200 may receive a charged state and the remaining amount of the battery, from the robot cleaner 100, thereby displaying them on one side of the screen of the display.

Referring to FIG. 3, the robot cleaner may further include a storage unit 180 configured to store therein at least one of image information, obstacle information, position information, a map, a cleaning region, a cleaning path, a moving path, and a patrolling path. The storage unit 180 is configured to store therein a control program for controlling the robot cleaner, and data associated with the control program. The storage unit 180 may further store therein a cleaning type, a running type, and a position of a charging station. As the storage unit 180, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical drive, a magnetic RAM, a PRAM, etc.

Referring to FIG. 3, the robot cleaner further includes a power unit 191. The power unit 191 is provided with a chargeable battery to supply power into the robot cleaner. The power unit 191 supplies, to each unit, a driving power and an operation power required when the robot cleaner moves or patrols, or when the robot cleaner performs a cleaning operation. When the remaining amount of power is deficient, the robot cleaner moves to a charging station to be supplied with a charging current. The robot cleaner further includes a battery sensing unit (not shown) configured to sense a charged state of a battery, and to transmit detection information to the control unit 130. As the battery is connected to the battery sensing unit, the remaining amount and a charged state of the battery are transmitted to the control unit 130. The remaining amount of battery power may be displayed on the screen of the output unit. The battery may be disposed at a central lower part of the robot cleaner. Alternatively, the battery may be disposed at one of the right and left sides so that a dust box can be positioned at the lowest end of the body. In the latter case, the robot cleaner may be further provided with a balance weight for preventing an unbalanced state of the battery.

The control unit 130 presets a reference value (battery remaining amount), and compares the battery remaining amount with the reference value. If the battery remaining amount is less than the reference value as a result of the comparison, the control unit 130 moves the robot cleaner to a charging station for charging. As an example, the control unit 130 may stop other operations according to a charging command applied from the terminal, and move the robot cleaner to the charging station. As another example, the control unit 130 may extract a charging command, and then may execute either the charging command or the previous operation, according to a result of the comparison between the battery remaining amount and the reference value.

Referring to FIG. 3, the robot cleaner may further include a cleaning unit 192. The cleaning unit 192 consists of a dust box configured to store collected dust particles therein, a suction fan configured to provide a driving power to suck dust particles within a cleaning region, and a suction motor configured to suck air by rotating the suction fan. The cleaning unit 192 further includes an agitator rotatably mounted to a lower part of the body of the robot cleaner, and a side brush configured to clean a corner or an edge of a wall, etc. with rotating centering around a vertical shaft of the body. The agitator makes dust particles on the floor or a carpet move to the air with rotating centering around a horizontal shaft of the body of the robot cleaner. A plurality of blades are provided on an outer circumferential surface of the agitator in a spiral form. A brush may be provided between the blades.

Figure 6:
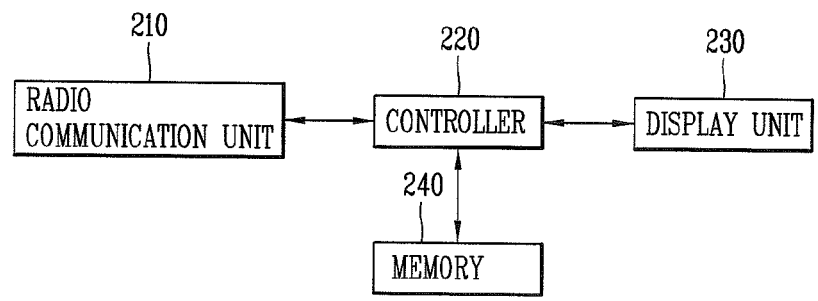
FIG. 6 is a block diagram showing a configuration of a terminal according to an embodiment.

Referring to FIG. 6, the terminal includes a radio communication unit 210, a controller 220, a display unit 230 and a memory 240.

The radio communication unit 210 is configured to transmit a control signal created from the controller 220 to the robot cleaner 100, and receive one or more data from the robot cleaner 100. Said one or more data include image information, obstacle information, position information, a map, a cleaning region, state information, etc. The radio communication unit 210 may include one or more modules through which radio communication is performed between the terminal 200 and a radio communication system, or between a plurality of terminals, or between the terminal and the robot cleaner 100. For instance, the radio communication unit 210 may include a broadcast receiving module, a mobile communication module, a wireless internet module, a short-range communication module, a position information module, etc.

The broadcast receiving module receives broadcast signals and/or broadcast associated information from an external broadcast management server (or other network entity) via a broadcast channel. The mobile communication module transmits and/or receives radio signals to and/or from at least one of a base station, an external terminal and a server. Such radio signals may include a voice call signal, a video call signal or various types of data according to text and/or multimedia message transmission and/or reception. The wireless Internet module supports wireless Internet access. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used. The short-range communication module is a module for supporting short range communications. Some examples of short-range communication technology include Bluetooth, Radio Frequency IDentification (RFID), Infrared Data Association (IrDA), Ultra-WideBand (UWB), ZigBee, and the like.

Figure 7:
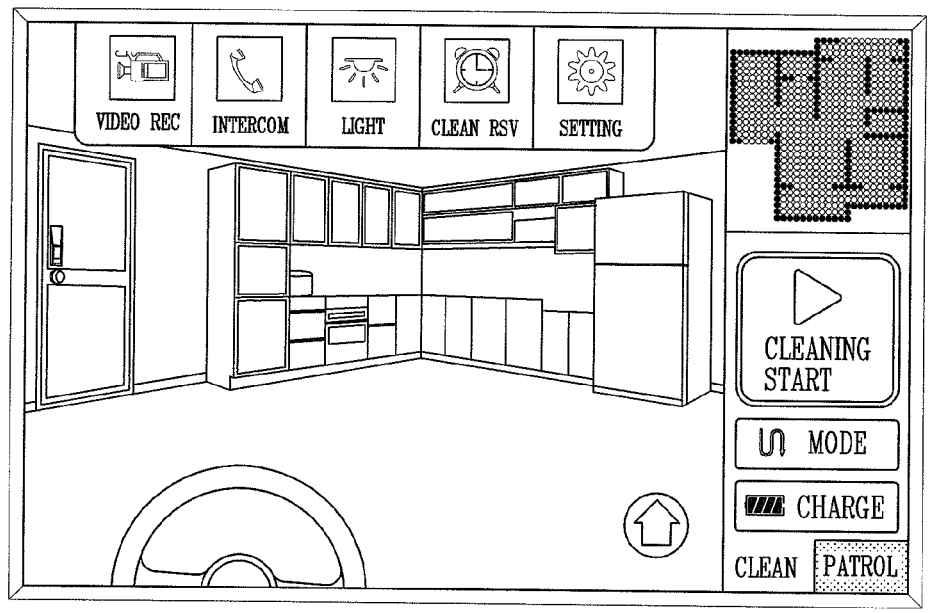
FIGS. 7 to 9 are views showing an example of screen conversion of a terminal which displays data of a robot cleaner.

The display unit 230 includes a touch recognition region 231 for receiving an input of a control command, and is configured to display a control screen created by the controller. The display unit 230 may display an icon according to a communication type (e.g., Wi-Fi, 3G), display communication sensitivity, and display the remaining amount of a battery of the robot cleaner. As shown in FIG. 7, the display unit 230 may display a touch recognition region having a first region (S232) and a second region (S233) equal to or less than the first region. The first region (S232) is configured to display the control screen, and on which the control command is input. In case of a mobile terminal or a notebook having no touch screen (touch pad), a touch recognition region is not implemented. In this case, an input unit to which a control command rather than a touch recognition command is input, may be separately formed from an output unit for outputting a control screen.

The display unit 230 may alternately display, on a touch recognition region, a moving start icon for inputting a moving start command, a patrol start icon for inputting a patrol start command, a moving stop icon for inputting a moving stop command, and a patrol stop icon for inputting a patrol stop command. The display unit 230 displays information processed in the terminal. That is, the display unit 230 displays a control screen. For instance, when the terminal is in a phone call mode, the display unit 230 may display a User Interface (UI) or a Graphic User Interface (GUI) associated with a call. The display unit 230 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

If the display unit 230 and a touch sensor for sensing a touch operation have a layered structure therebetween, the display unit 230 may be used as an input touch screen as well as an output device. The touch sensor may be implemented as a touch film, a touch sheet, a touch pad, and the like. The touch sensor may be configured to convert changes of a pressure applied to a specific part of the display unit 230, or a capacitance occurring from a specific part of the display unit 230, into electric input signals. Also, the touch sensor may be configured to sense not only a touched position and a touched area, but also a touch pressure. The touch sensor may be implemented as a proximity-touch sensor which does not substantially touch the screen, but approach to the screen with a distance. The touch sensor may indicate a sensor to sense presence or absence of an object approaching to a surface to be sensed, or an object disposed near a surface to be sensed, by using an electromagnetic field or infrared rays without a mechanical contact. In the present disclosure, 'touch recognition' includes not only 'proximity touch', a status that the pointer is positioned to be proximate onto the touch screen without contact, but also 'contact touch', a status that the pointer substantially comes in contact with the touch screen.

The memory 240 may store a program for the processing and control of the controller 220. Alternatively, the memory 240 may temporarily store input/output data (e.g., phone book data, messages, still images, video and the like). Also, the memory 240 may pre-store a control signal for controlling the robot cleaner, and a control command corresponding to the control signal, in a patterned manner. The controller 220 may video-record image information received from the robot cleaner for a preset time, and the memory 240 may store the video-recorded image information.

The terminal may further include an audio/video (A/V) input unit, a user input unit, a sensing unit, an interface unit, a power supply unit, etc.

The A/V input unit is configured to receive an audio or video signal, and may include a camera, a microphone or the like. The user input unit may create input data for allowing a user to control various operations of the terminal. The user input unit may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 230 in a layered manner, it may form a touch screen. The sensing unit detects a current status (or state) of the terminal, a location of the terminal, the presence or absence of a user's touch (contact) with the terminal, the orientation of the terminal, an acceleration or deceleration movement of the terminal, etc, and creates commands or signals for controlling the operation of the terminal.

The interface unit may be generally implemented to interface the terminal 200 with external devices. The interface unit may allow data reception from an external device, power delivery to each component in the terminal, or a data transmission from the terminal to an external device. The power unit receives external power or inner power under control of the controller 220, and supplies required power to each component.

The controller 220 typically controls the overall operations of the terminal. For example, in case of a mobile phone or a smart phone, the controller 220 performs the control and processing associated with telephony calls, data communications, video calls, and the like. The controller 220 may perform a pattern recognition processing so as to recognize writing or drawing input on the display unit 230 as a text or an image.

The controller 220 is configured to create a control signal corresponding to a control command with respect to the robot cleaner 100, and to create a control screen using data and a response signal. The control command includes a cleaning command, a moving command, a patrol command, a charging command, a setting change, etc. And, the control command may be a command for turning on or off power of a light 113 provided at the robot cleaner 100. The display unit 230 may further display a light icon for turning on or off power of the light 113 of the robot cleaner 100. As anther example, the terminal may transmit a control signal to the robot cleaner, and may allow the robot cleaner to open or close an external light by transmitting or receiving a signal to/from a light controller of an external light which is disposed on the same place.

Upon detection of a touch input to one or more points on a map displayed on the screen of the display unit, the controller 220 may set a moving path using said one or more points. The moving path is a path according to a moving command for instructing the robot cleaner to move to other position from the current position or a predetermined position. Once a user touches a plurality of points on a map so that the starting point can be consistent with the ending point, the controller 220 may set a patrol path that the starting point is consistent with the ending point. The moving command may be a patrol command for instructing the robot cleaner to move along the patrol path, and the robot cleaner transmits image information to the terminal while executing the patrol command.

The controller 220 may video-record image information received from the robot cleaner for a preset time, and the memory 240 may store the video-recorded image information.

As another example, the video-recorded image information may be stored in other storage device. In this case, the controller 220 video-records image information received from the robot cleaner for a preset time. The radio communication unit 210 is accessed to an external storage device, e.g., a database server, a cloud server, a web server, etc., and transmits the video-recorded image information to the external storage device.

Figure 68:
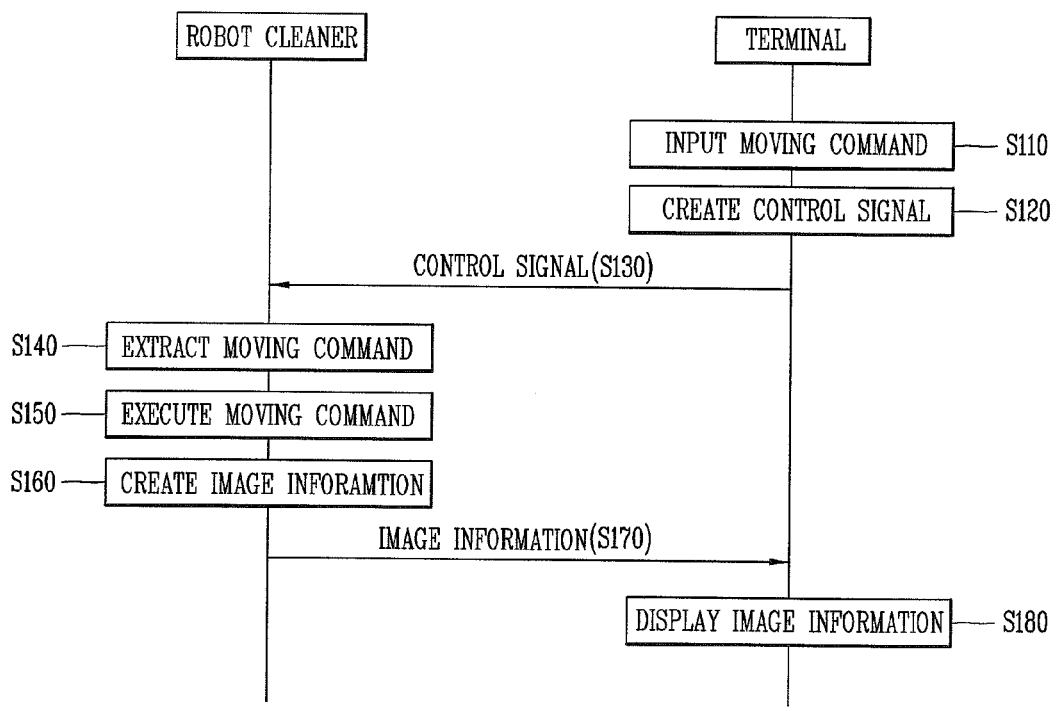
FIGS. 68 to 71 are flowcharts schematically showing a method for remote-controlling a robot cleaner according to embodiments of the present disclosure.

Referring to FIG. 68, a method for remotely controlling a robot cleaner according to an embodiment of the present disclosure includes a robot cleaner's receiving a control signal from a terminal (S130), the robot cleaner's extracting a moving command from the control signal (S140), the robot cleaner's executing the moving command and moving along a moving path (S150), the robot cleaner's creating image information by capturing the periphery while executing the moving command (S160), the robot cleaner's transmitting the image information to the terminal (S170), and the terminal's displaying the image information on a screen (S180). Hereinafter, the robot cleaner, and a remote control system including the terminal for controlling the robot cleaner, will be explained with reference to FIGS. 1 to 6.

The terminal 200 receives a control command (S110), and creates a control signal corresponding to the control command (S120). The control command may include a moving start command, a patrol start command, a moving stop command, a patrol stop command, a cleaning command, a charging command, a setting change, etc. Once a user inputs a control command by touching the patrol start command or the patrol stop command (S110), the terminal creates a control signal in correspondence to a communication protocol (S120), and transmits the control signal to the robot cleaner 100 through a network (S130). The robot cleaner extracts the control command included in the control signal (S140), and executes a moving command or a patrol command (S150). Here, the robot cleaner continuously transmits data such as image information, a map, and obstacle information, to the terminal (S170). And, the terminal creates a control screen using the data, and displays the created control screen (S180).

Figure 69:
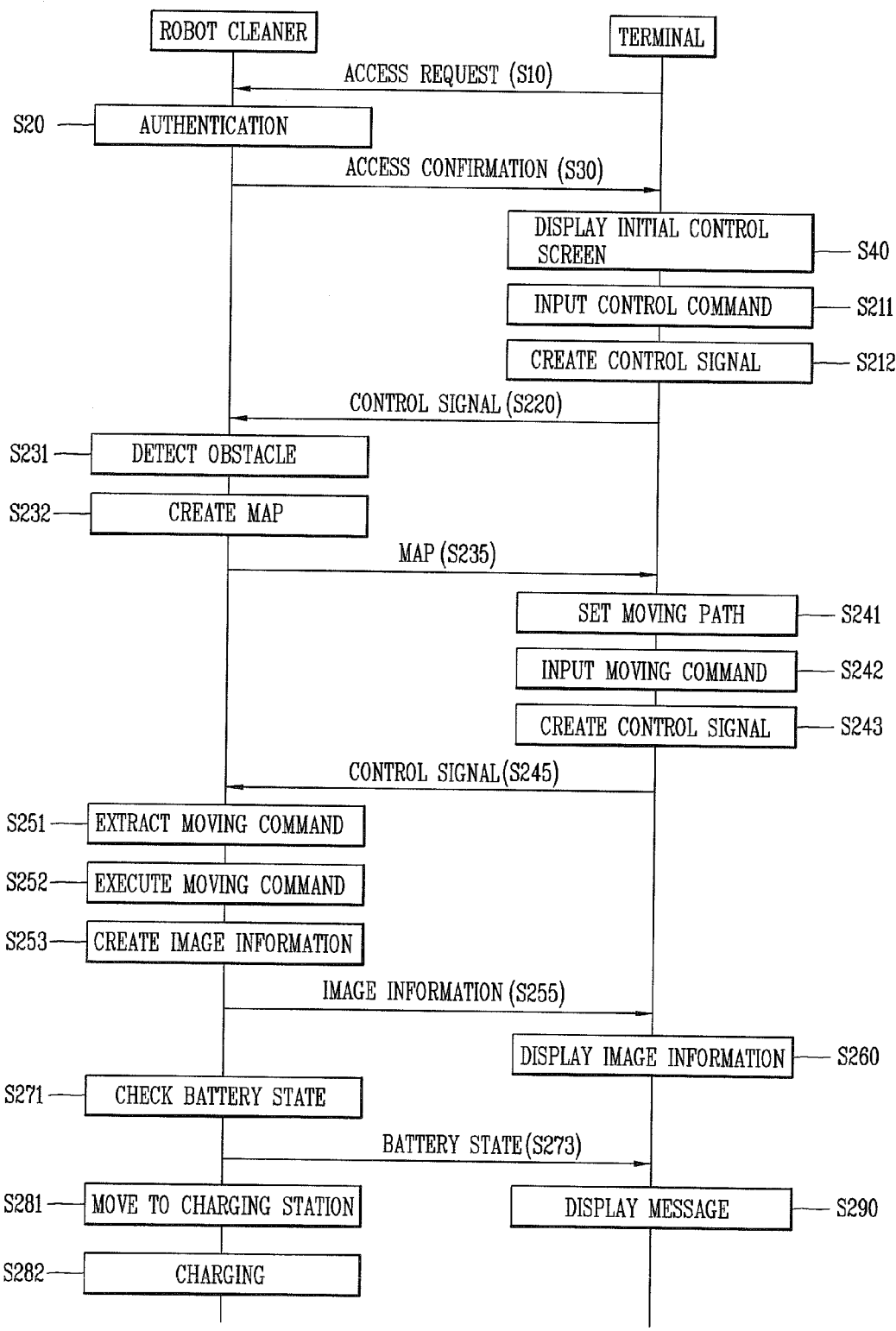

Referring to FIG. 69, the robot cleaner may continuously sense a charged state of a battery while moving or patrolling (S271), and may transmit sensing information to the terminal (S273). Even if there is no charging command received from the terminal, the robot cleaner may move to a charging station (S281) based on the sensing information, and perform a charging operation (S282).

Referring to FIG. 69, the method for remotely controlling a robot cleaner may further include the terminal's requesting access to the robot cleaner (S10), the robot cleaner's authenticating the access (S20), the robot cleaner's approving and verifying the access to the terminal (S30), and the terminal's displaying an initial control screen (S40).

Once the terminal executes a remote control program for remotely controlling the robot cleaner, a log-in window for inputting log-in information on the robot cleaner is created. The remote control program may be pre-stored in a memory of the terminal, or may be downloaded from a server which stores therein a remote control program. In case of a smart phone, a remote control program is downloaded in the form of an application, and then is displayed on the screen of the display unit in the form of an icon, so that a user can execute the application by touching the icon. Once the user inputs log-in information, the terminal requests for access to the robot cleaner (S10). The robot cleaner may execute an authentication with respect to the log-in information, and the terminal may display, on the screen, a message informing that the terminal is accessing the robot cleaner.

The terminal may be accessed to one of a plurality of robot cleaners. The display unit displays a plurality of connectable robot cleaners, in the form of a list or icons. Once a user selects one of the plurality of robot cleaners, the selected robot cleaner executes an authentication with respect to the terminal.

After the authentication, the robot cleaner transmits an access confirmation signal to the terminal (S30), and the terminal displays an initial control screen (S40). The initial control screen may include an option menu, or may include data such as image information and a map. In the latter case, upon detection of a touch input to a first region, the display unit may display an option menu. And, the controller may control the display unit to temporarily display an option menu and then to display data as the initial control screen.

If log-in information is not consistent with pre-stored authentication information, the robot cleaner transmits an access non-acknowledgement signal to the terminal. Then, the terminal displays an error message such as 'ID or password is not correct. Please try again after check.'. Also, if a robot cleaner to be accessed has already accessed other terminal, or a robot cleaner to be accessed is being used by other user, the display unit may display an error message. The terminal may display a guide message according to a communication type. If a robot cleaner selected by a user has not been registered to a network, or if the robot cleaner has not accessed a network, the terminal may display an error message.

Figure 8:
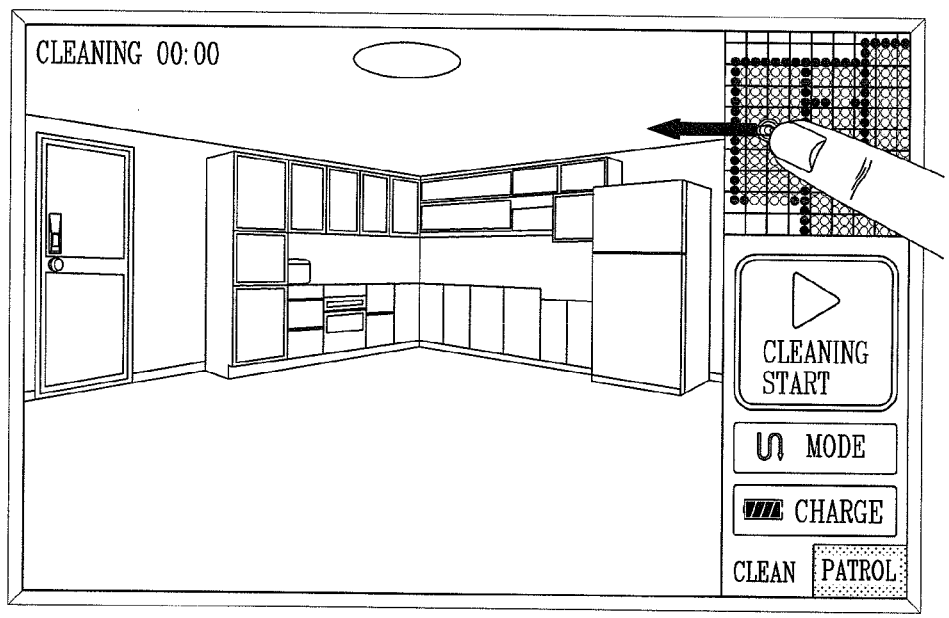
Figure 9:
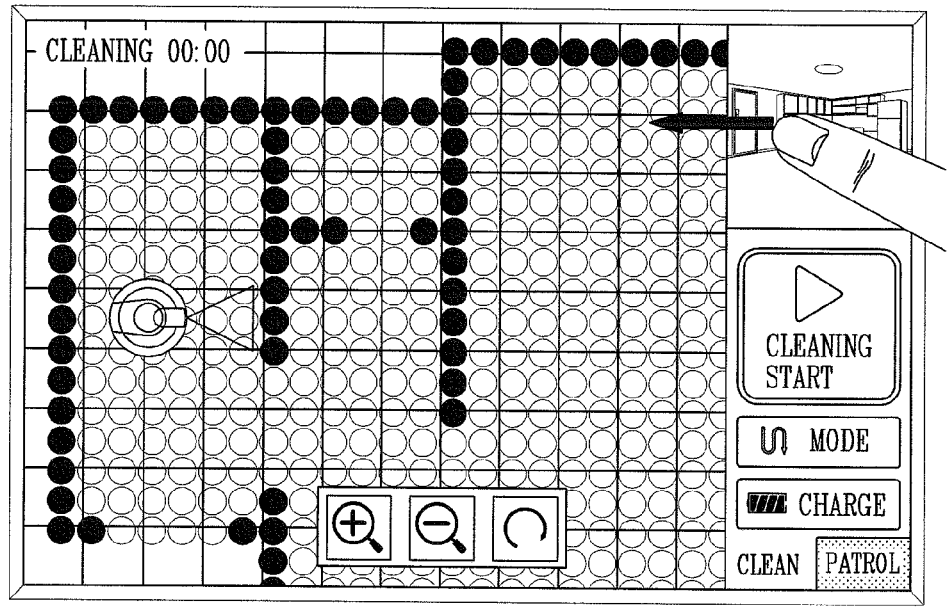

FIGS. 7 and 8 are views showing examples of an initial control screen. Once a user inputs log-in information, the terminal requests for access to the robot cleaner (S10). If the robot cleaner transmits an access confirmation signal to the terminal (S30) after having performed the authentication (S20), the display unit displays an initial control screen (S40). The terminal may display an option menu for a predetermined time as shown in FIG. 7, and then may display preset image information, map, etc. on the initial control screen as shown in FIG. 8. As shown in FIGS. 8 and 9, a map region and an image information region may be switched from each other. For instance, if a first region having been touched is dragged to a second region, or if a second region having been touched is dragged to a first region, data displayed on the first region may be switched from data displayed on the second region.

Figure 10:
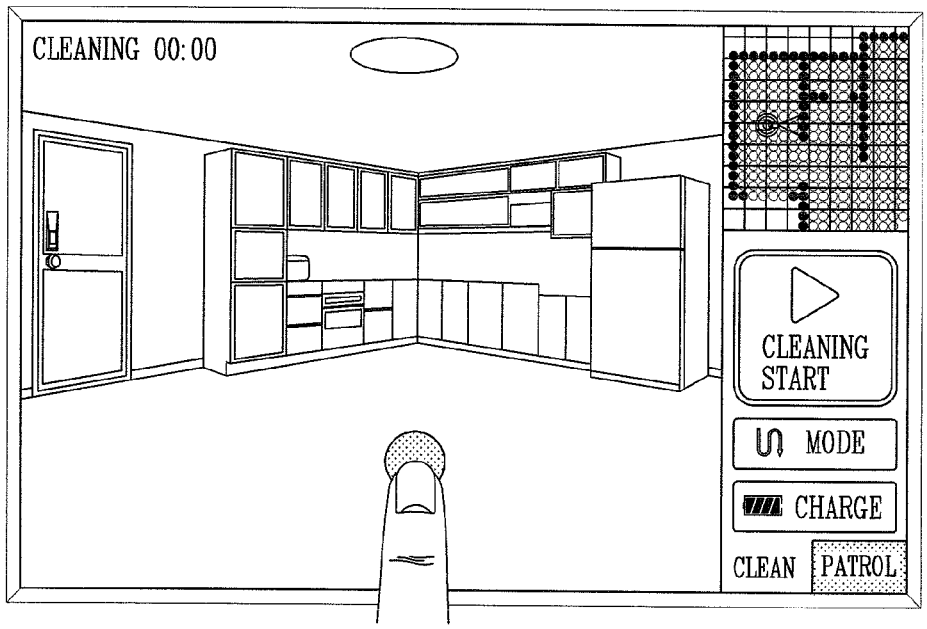
FIGS. 10 to 12 are views showing a screen of a terminal for explaining a manual operation of a robot cleaner using the terminal.
Figure 11:
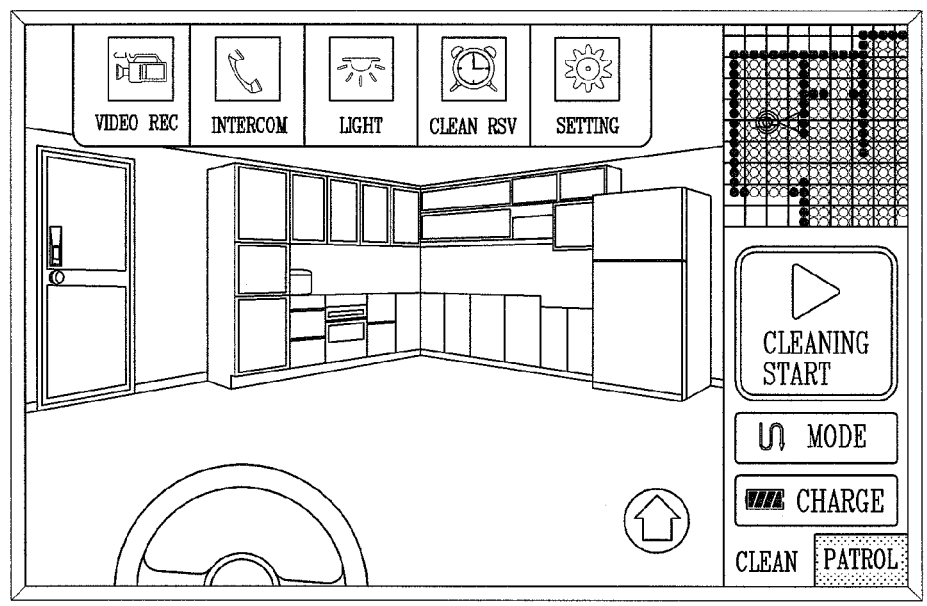
Figure 12:
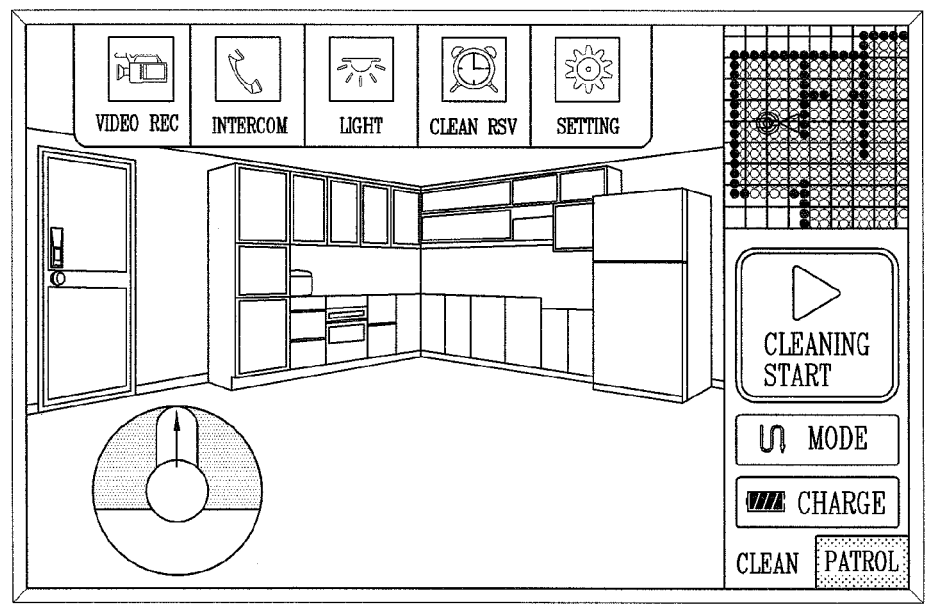

Referring to FIG. 10, if a touch input is applied to the first region while the robot cleaner performs a control command or while the robot cleaner is in a standby state, the display unit displays an option menu. The configuration of the option menu may be variable according to a design. For instance, as shown in FIG. 11, the option menu may include menus such as video-recording, interphone, lighting, cleaning reservation and setting. As shown in FIG. 11 or 12, the display unit may further display an icon for enabling a manual operation of the robot cleaner. Once a cleaning command is input through a manual operation, the terminal creates a control signal and transmits the control signal to the robot cleaner.

Figure 13:
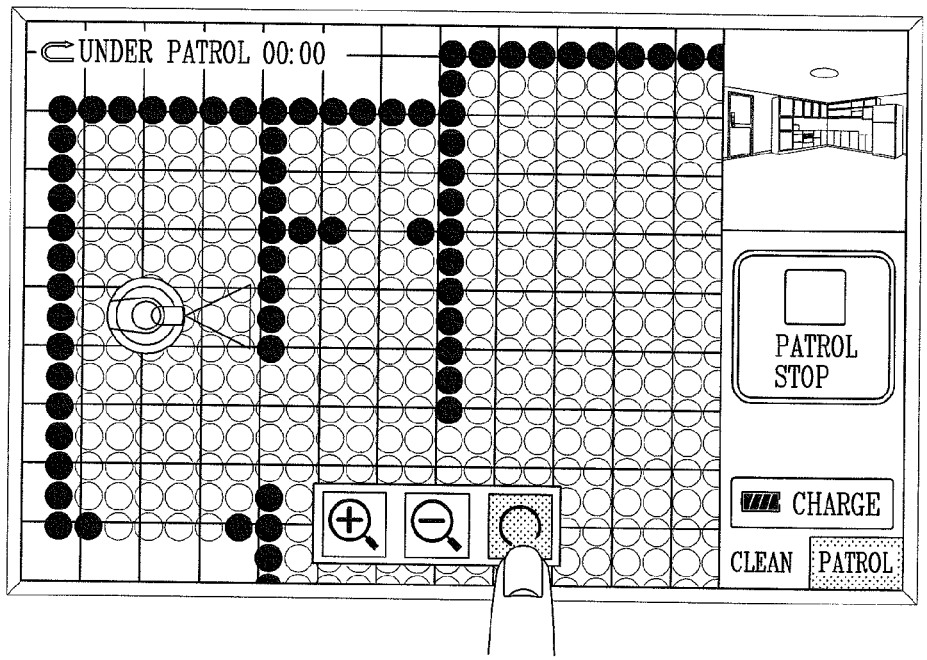
FIGS. 13 and 14 are views showing a screen of a terminal for explaining an operation to manipulate a map displayed on the screen.
Figure 14:
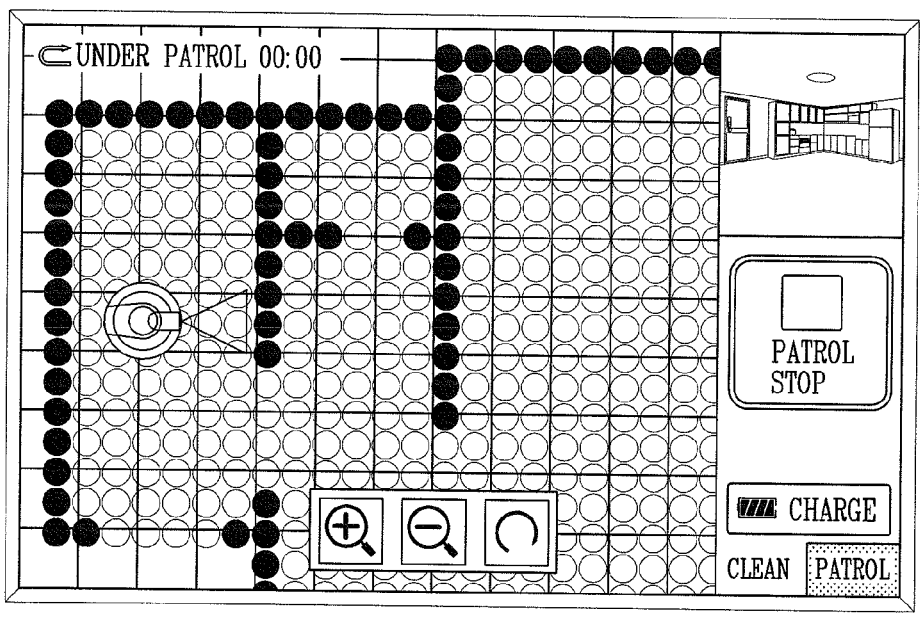
Figure 15:
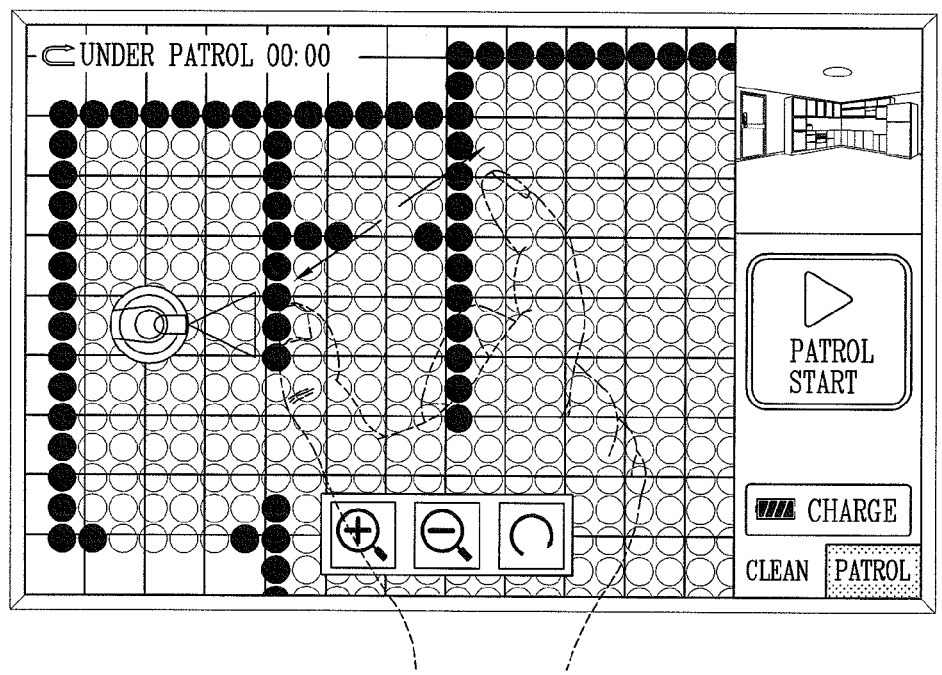
FIGS. 15 to 17 are views showing a screen of a terminal for explaining an operation to manipulate a control screen displayed on the screen.
Figure 16:
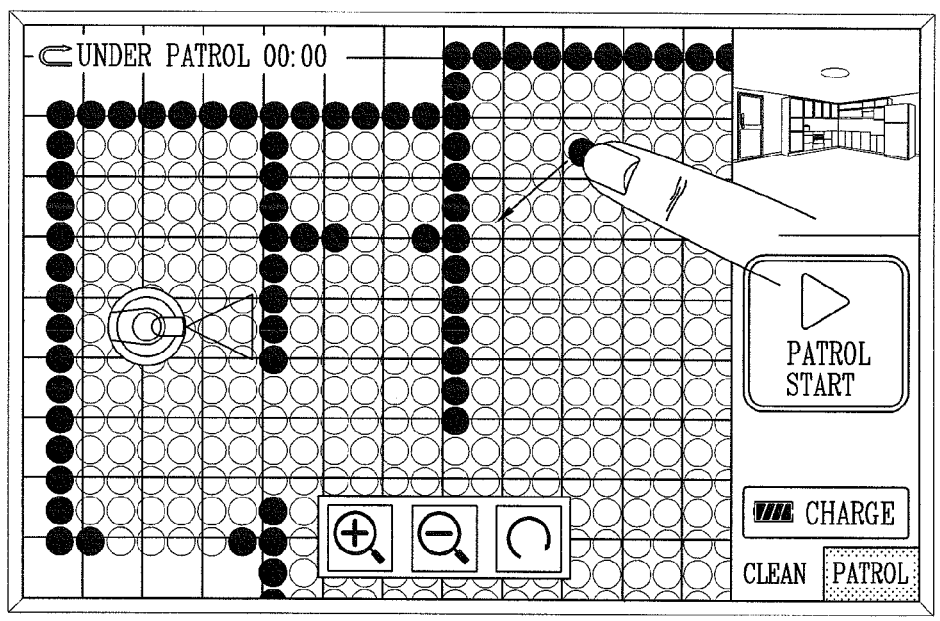
Figure 17:
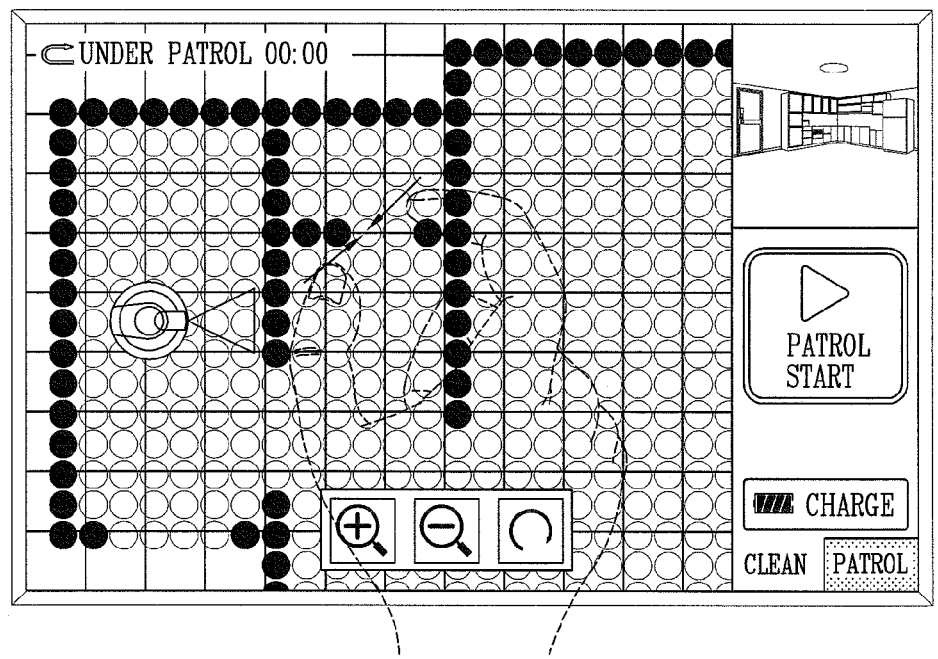

Referring to FIGS. 13 to 17, the terminal may edit a map displayed on the screen of the display unit. Referring to FIGS. 13 and 14, the display unit may display icons including enlargement, contraction, rotation, etc., on a lower end of the control screen. Once a user touches the rotation icon, the terminal displays the map in a rotating manner. As shown in FIG. 15, if a user multi-touches the map using two fingers and then drags the map towards the outside, the display unit displays the map in an enlargement manner. As shown in FIG. 16, if a user touches a predetermined point and then drags the touched point, the display unit displays the map in a moving manner towards the dragged direction. If a user touches a predetermined point, the display unit displays the map so that the touched point can be positioned at the center of the screen. As shown in FIG. 17, if a user multi-touches the map using two fingers and then drags the map towards the inside, the display unit displays the map in a contraction manner. The display unit may display the robot cleaner on the map in the form of an icon. When a user touches the icon, the display unit may display the map so that the current position of the robot cleaner can be positioned at the center of the screen.

Figure 18:
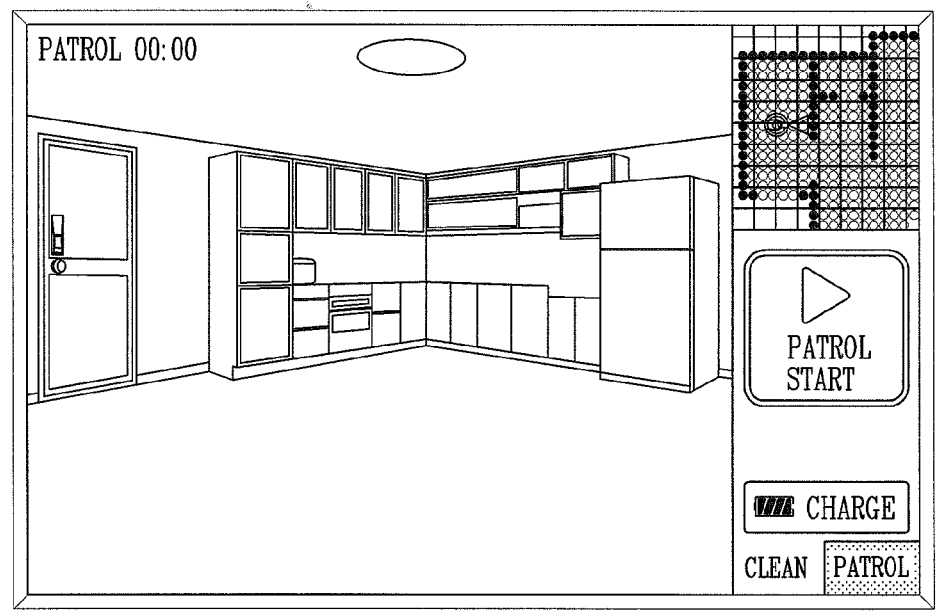
FIGS. 18 and 19 are views showing a cleaning screen and a patrol screen, respectively, the cleaning screen on which a cleaning operation being currently performed by the robot cleaner is displayed, and the patrol screen on which a patrol operation being currently performed by the robot cleaner is displayed.
Figure 19:
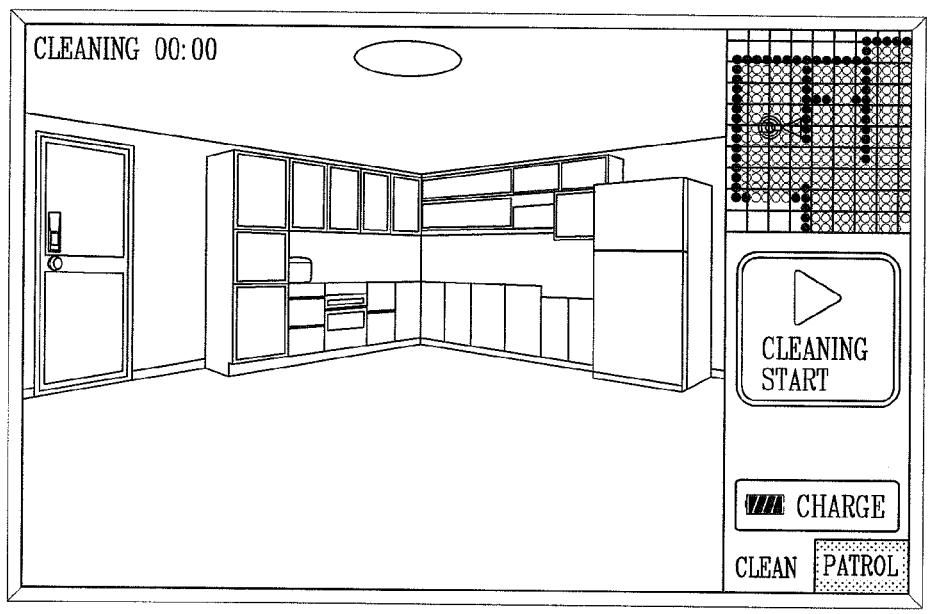

Referring to FIGS. 18 and 19, the display unit may display a cleaning tap which displays a screen for inputting a cleaning start command or a cleaning stop command, and may display a patrol tap which displays a screen for inputting a patrol command. As shown in FIG. 18, the terminal displays a control screen for inputting a patrol command, and receives a touch input with respect to the patrol tap. Then, the terminal may display a cleaning screen on the screen of the display unit as shown in FIG. 19.

Figure 20:
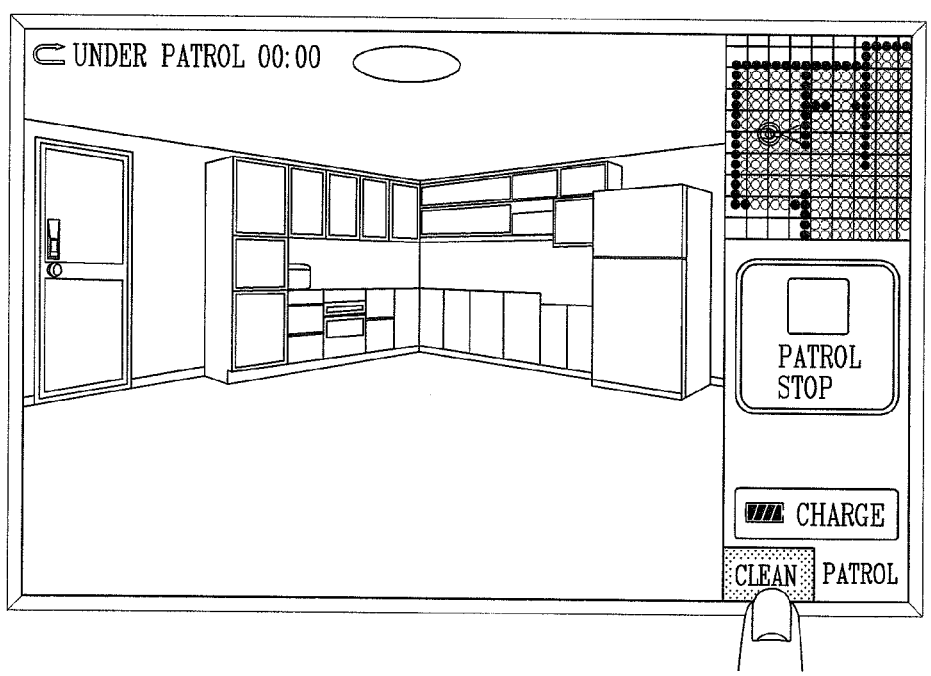
FIGS. 20 to 22 are views showing a screen of a terminal, for explaining an operation to instruct the robot cleaner to execute a cleaning command while the robot cleaner patrols.
Figure 21:
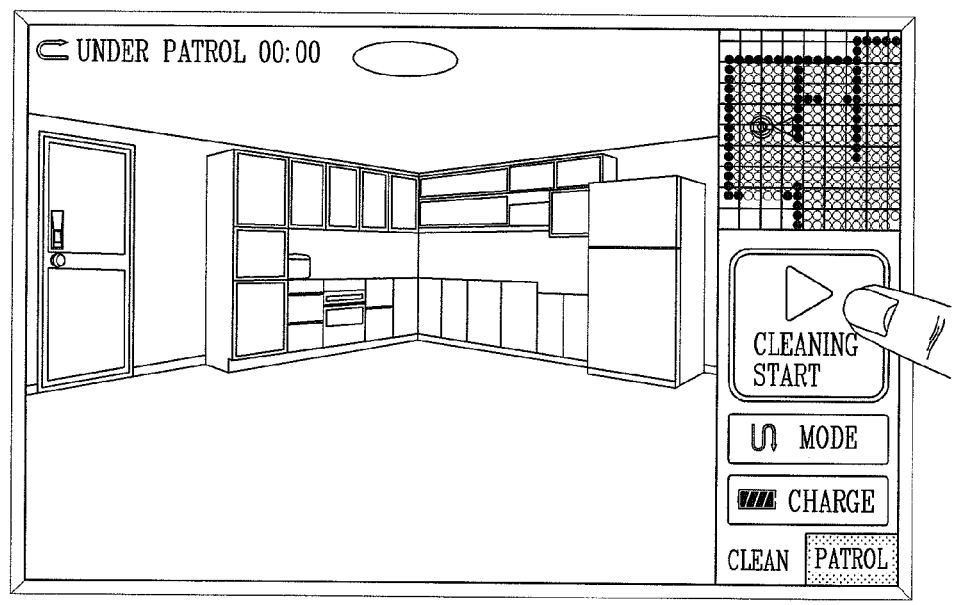
Figure 22:
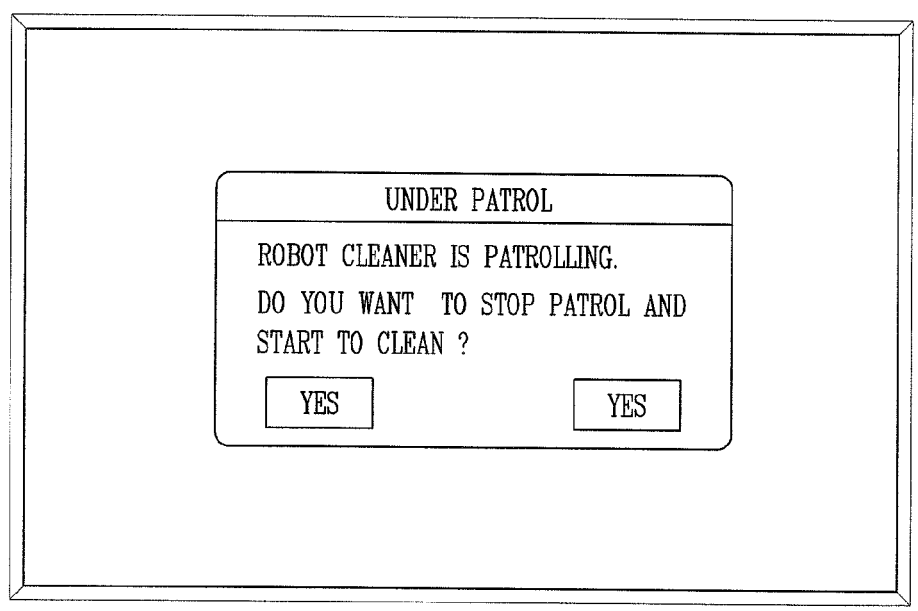

Referring to FIG. 20, while the robot cleaner patrols (moves), a user may touch the cleaning tap. In this case, the display unit changes the current screen into a cleaning screen as shown in FIG. 21. Then, if a user touches a cleaning start icon, the display unit displays, on the screen, a message notifying that "The robot cleaner is patrolling. Do you want to stop the patrol and start cleaning?"

Figure 23:
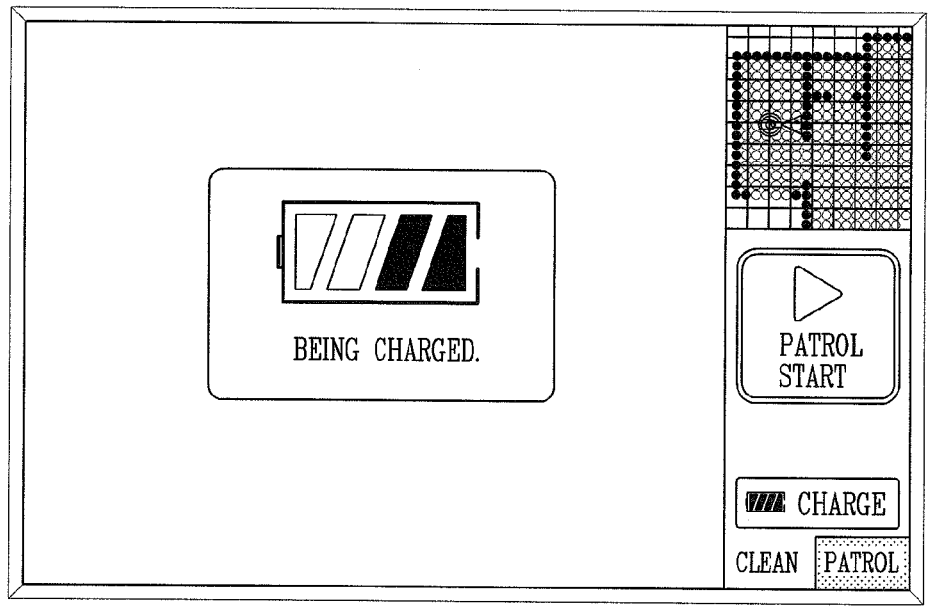
FIGS. 23 to 26 are views showing a screen of a terminal, for explaining an operation to instruct the robot cleaner to execute a patrol command while the robot cleaner is charged.
Figure 24:
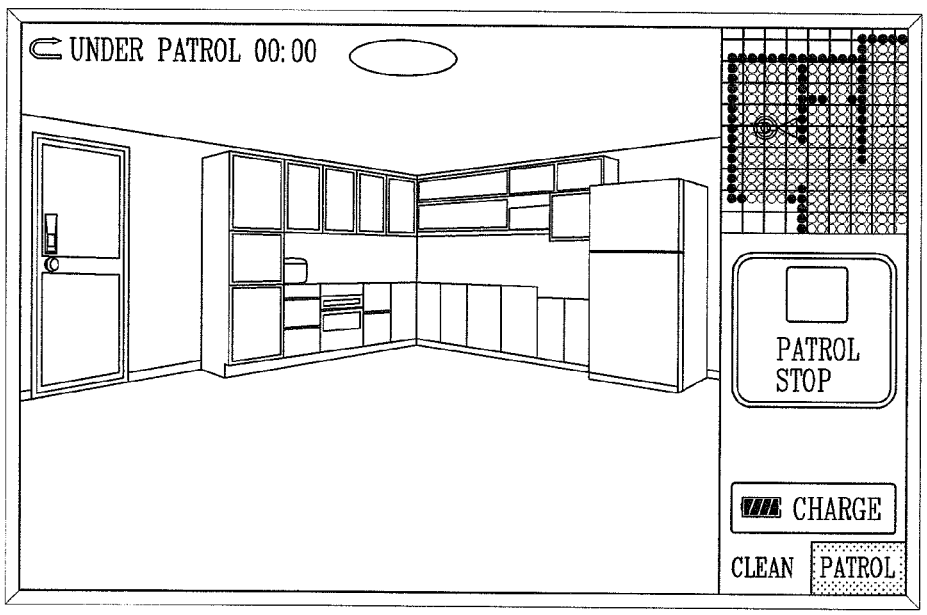
Figure 25:
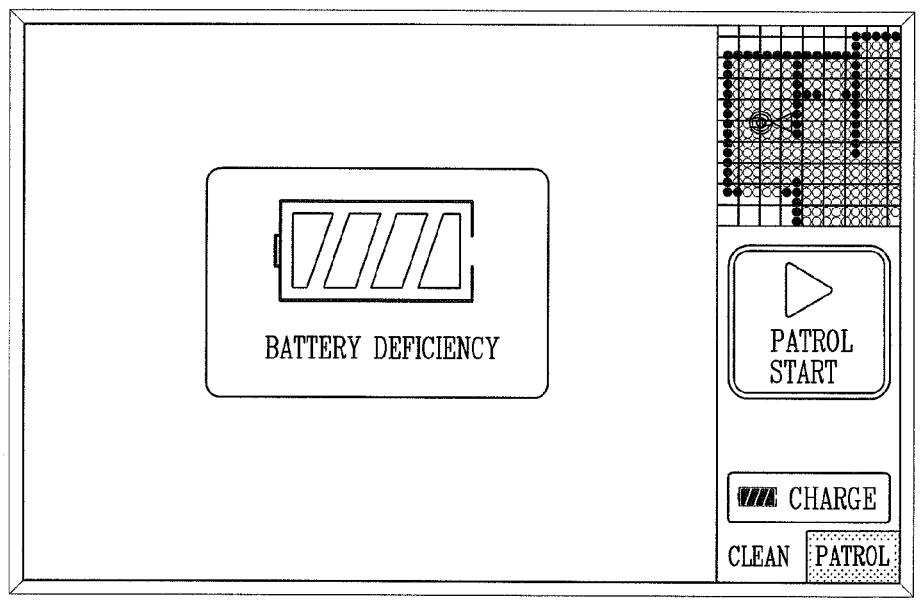
Figure 26:
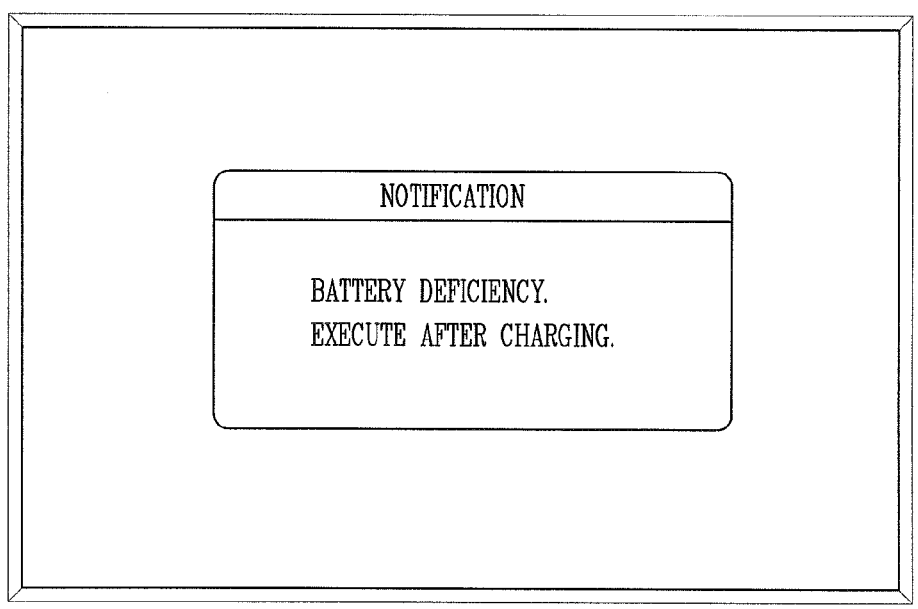

Referring to FIG. 23, a user may input a patrol start command while the robot cleaner is being charged. As shown in FIG. 24, the terminal creates a control signal corresponding to the patrol start command, and transmits the control signal to the robot cleaner. Then, the robot cleaner starts to patrol according to the patrol start command. The terminal displays, on the display unit, a control screen created by using data received from the robot cleaner. As shown in FIG. 25 or 26, the robot cleaner may check a charged state of a battery thus to transmit state information to the terminal while patrolling. Then, the terminal may display, on the screen, an error message such as "The remaining amount of battery is not sufficient." and "Execute after charging."

Referring to FIG. 69, the method for remotely controlling a robot cleaner may further include the robot cleaner's detecting a peripheral obstacle (S231), the robot cleaner's creating a map using obstacle information (S232), and the robot cleaner's transmitting the map to the terminal (S235). The method may further include the terminal's displaying the map, and the terminal's receiving an input of a moving path on the map (S241).

The robot cleaner may create a map while patrolling or moving. The terminal may display, on the screen, the operation to create a map by the robot cleaner. The robot cleaner may detect an image to transmit image information to the terminal, and may create a map to transmit the map to the terminal. In this case, the display unit may display the image information on the first region, and may display the map on the second region. If the first region is dragged to the second region, or if the second region is dragged to the first region, the display unit may display the image information and the map in a switching manner.

Figure 27:
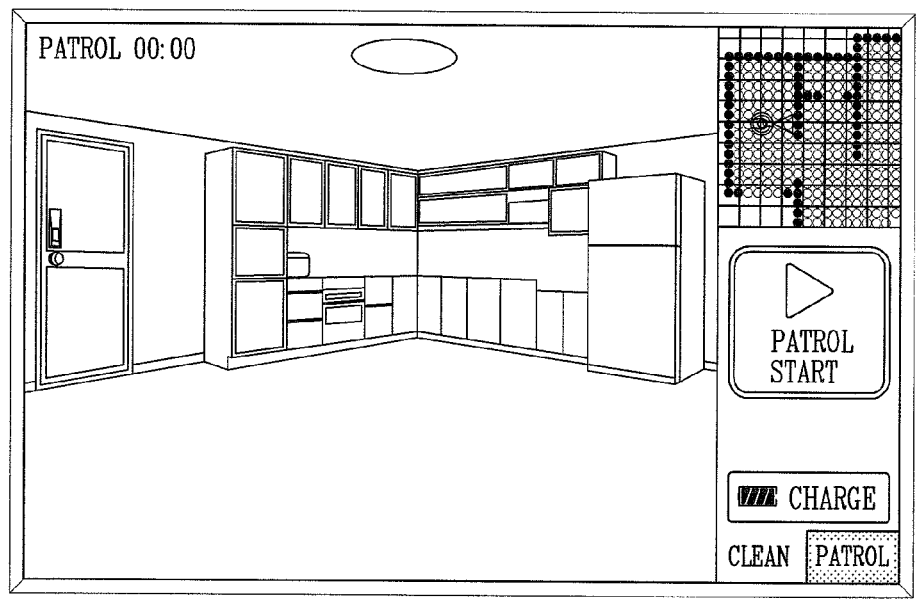
FIGS. 27 to 32 are views showing an example of a screen of a terminal, for explaining an operation to set a moving path of a robot cleaner, and an operation to transmit a moving command.
Figure 28:
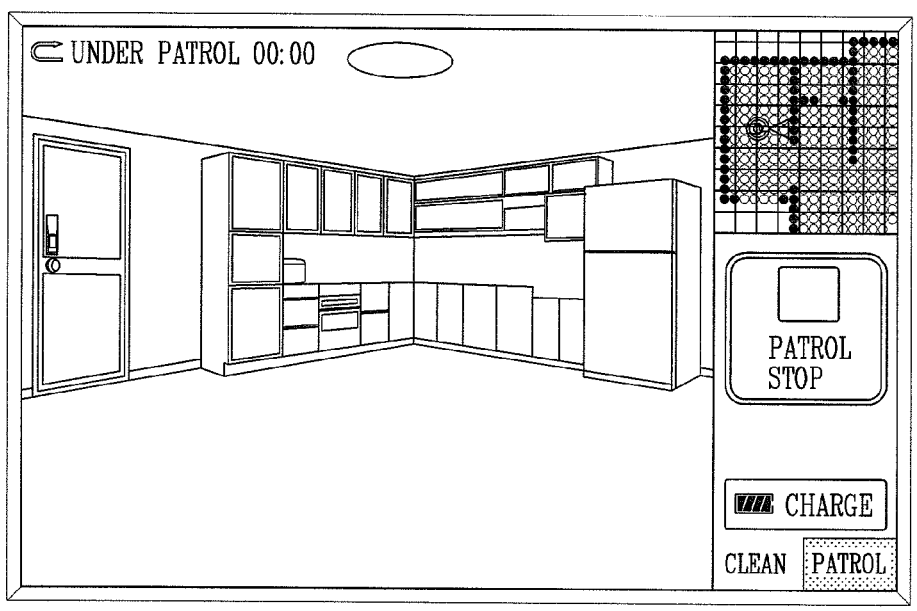
Figure 29:
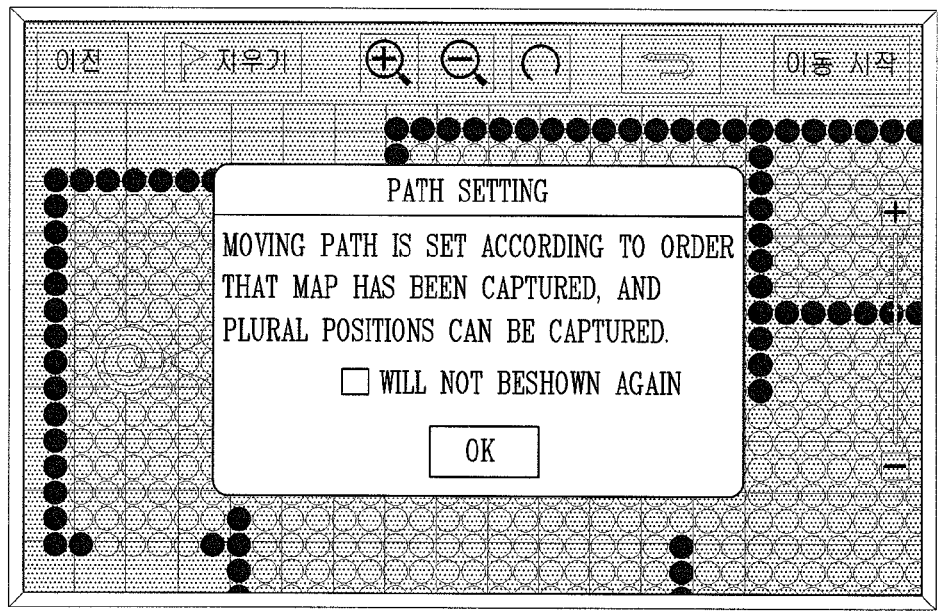
Figure 30:
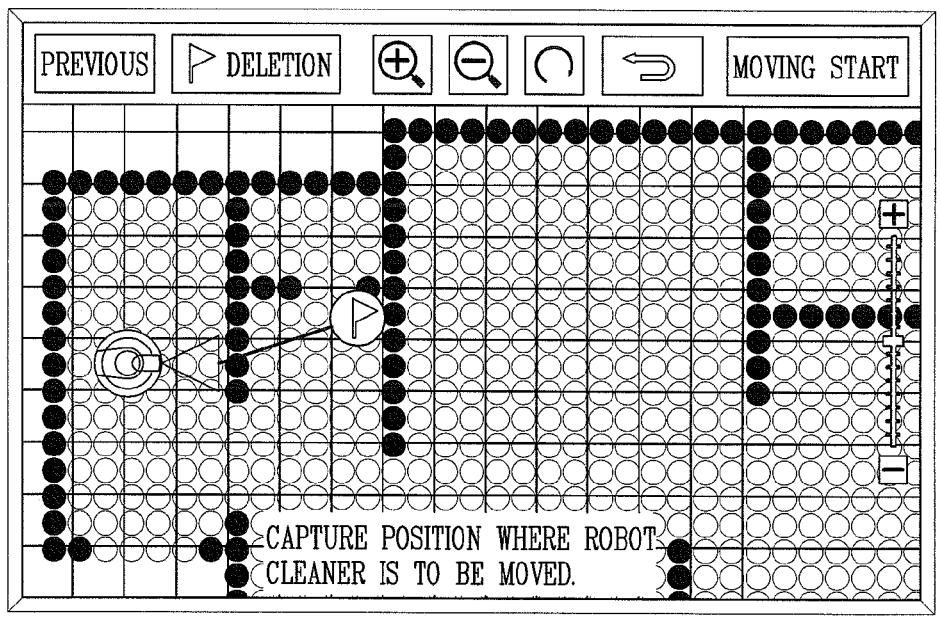
Figure 31:
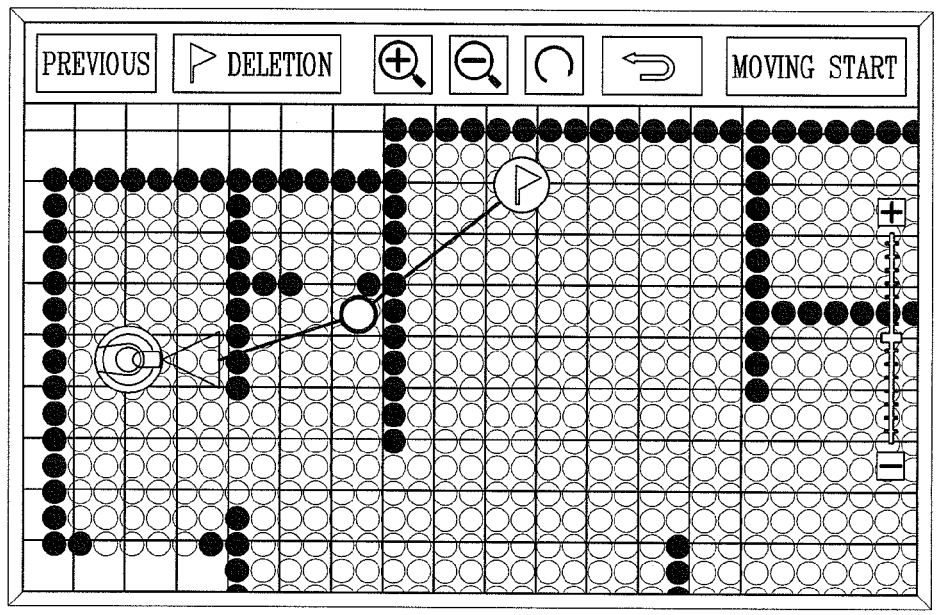
Figure 32:
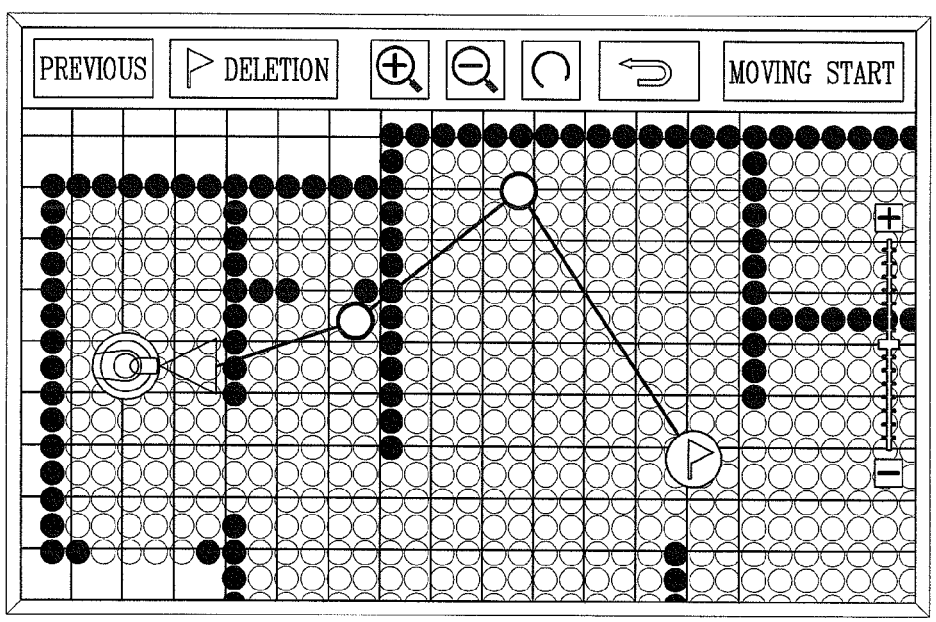
Figure 33:
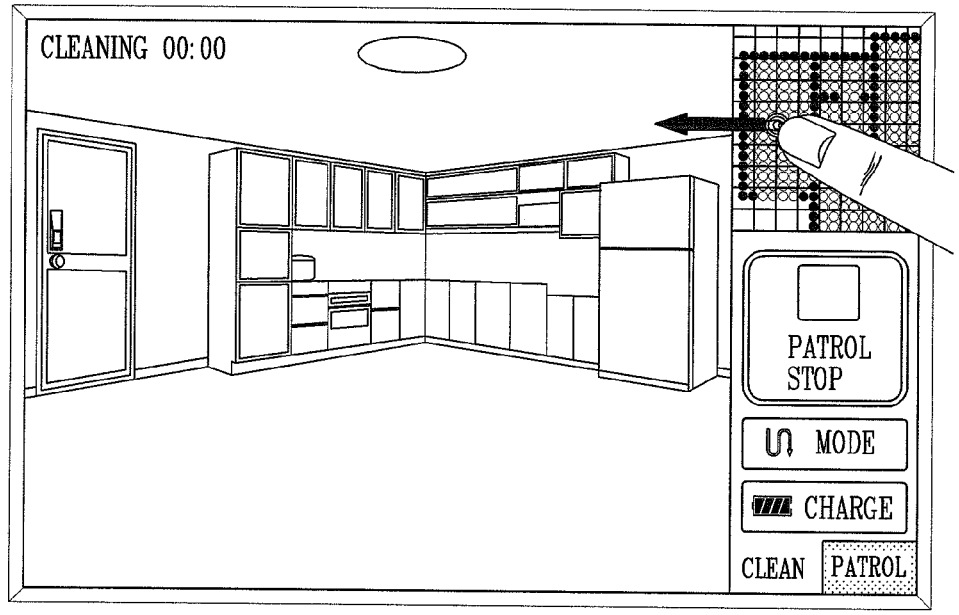
FIGS. 33 to 35 are views showing another example of a screen of a terminal, for explaining an operation to set a moving path of a robot cleaner, and an operation to transmit a moving command.
Figure 34:
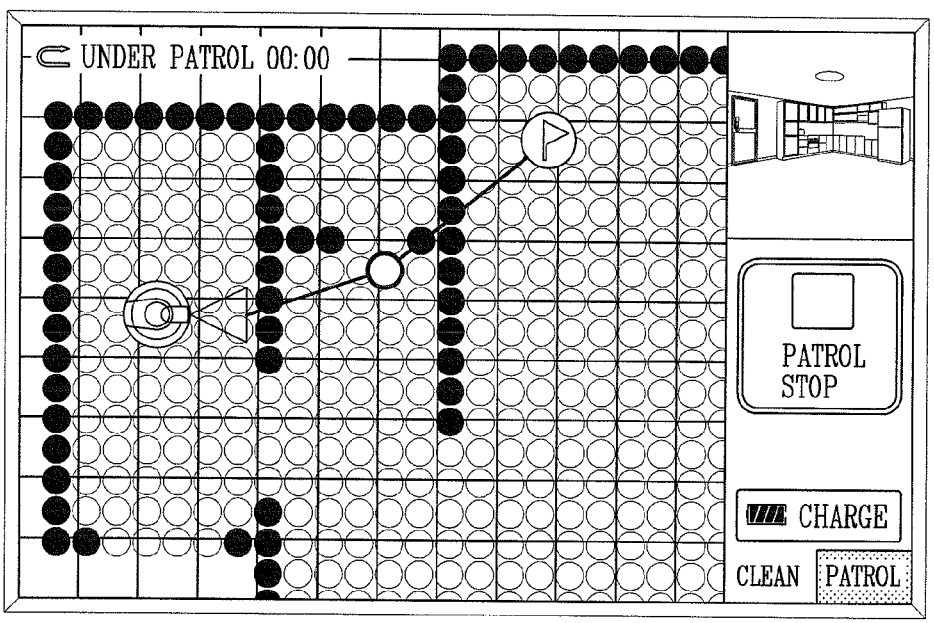
Figure 35:
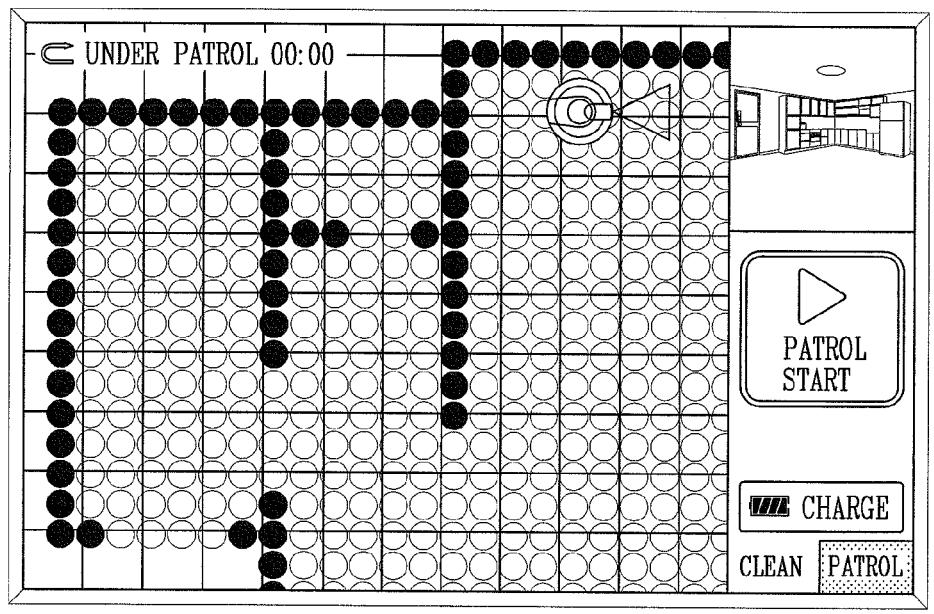

As shown in FIGS. 27 and 28, if a user touches a patrol start icon (or inputs a moving command) so that a patrol start command can be executed (S252), the terminal may display a path setting screen on the display unit as shown in FIG. 29. As shown in FIGS. 30 to 32, if a user sequentially touches predetermined points on the map, the controller sets a moving path (patrol path) by connecting the points to each other (S241). As shown in FIGS. 33 to 35, the terminal may display the map on the first region by a user's input, and then set a moving path or a patrol path.

Figure 36:
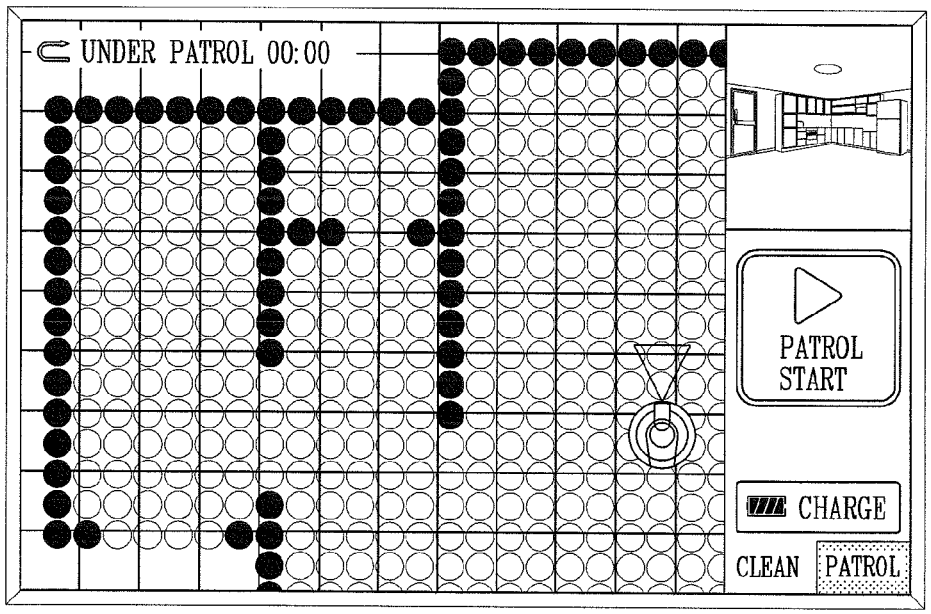
FIGS. 36 to 38 are views showing a screen of a terminal, for explaining conversion of a patrol command a moving command.
Figure 37:
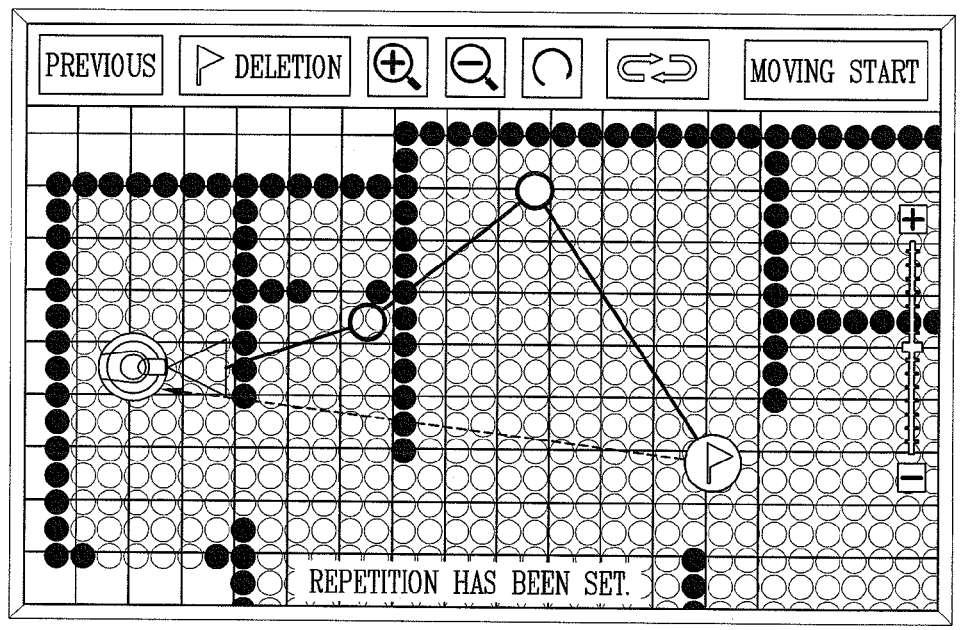
Figure 38:
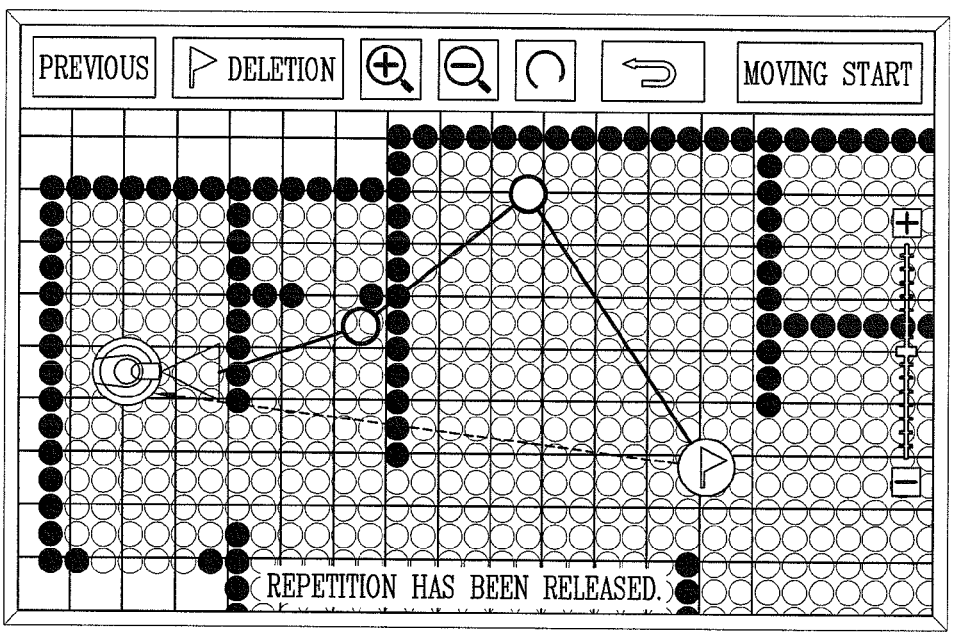

Referring to FIGS. 36 to 38, the display unit may automatically display a patrol start button and a moving start button, in an alternate manner according to a path setting on the map. If a user connects a path to the current position as shown in FIG. 37, the controller sets a patrol path and the display unit displays a patrol start button on the screen. On the other hand, if a user sets a path without repetition as shown in FIG. 38, the controller sets a patrol path and the display unit displays a moving start button on the screen.

Figure 39:
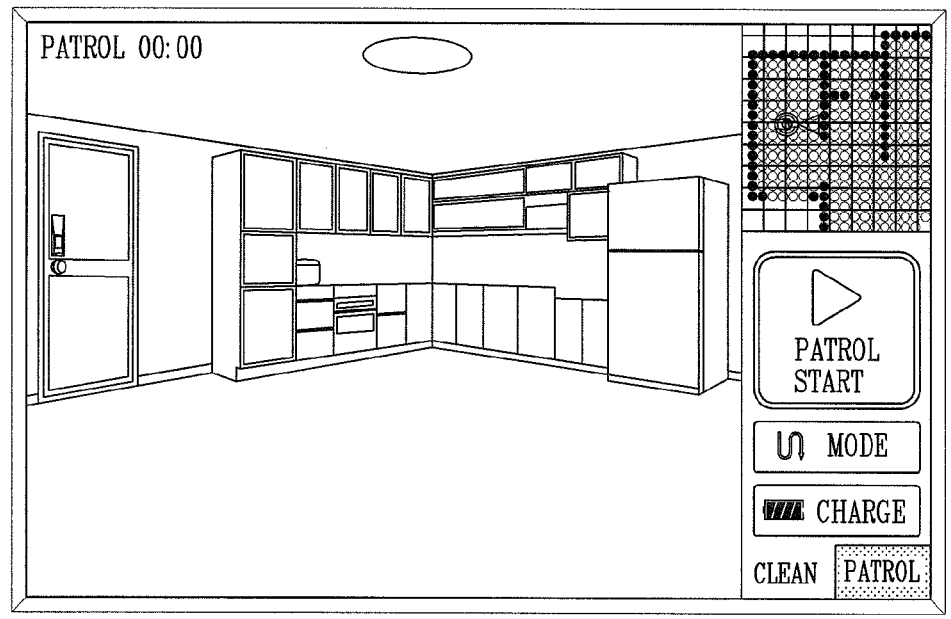
FIGS. 39 to 44 are views showing a screen of a terminal, for explaining an operation to execute a patrol command or a moving command while a robot cleaner creates a map.
Figure 40:
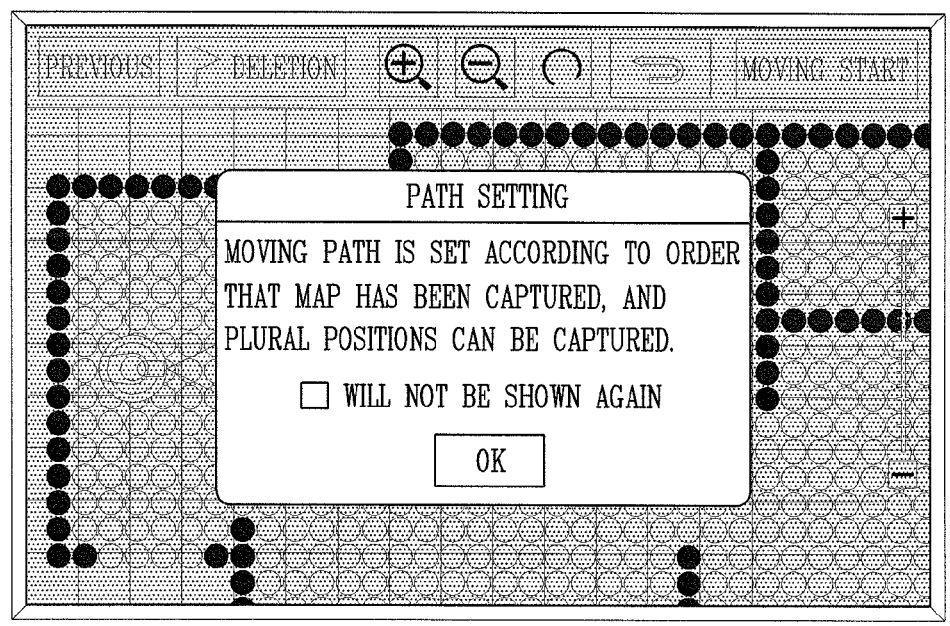
Figure 41:
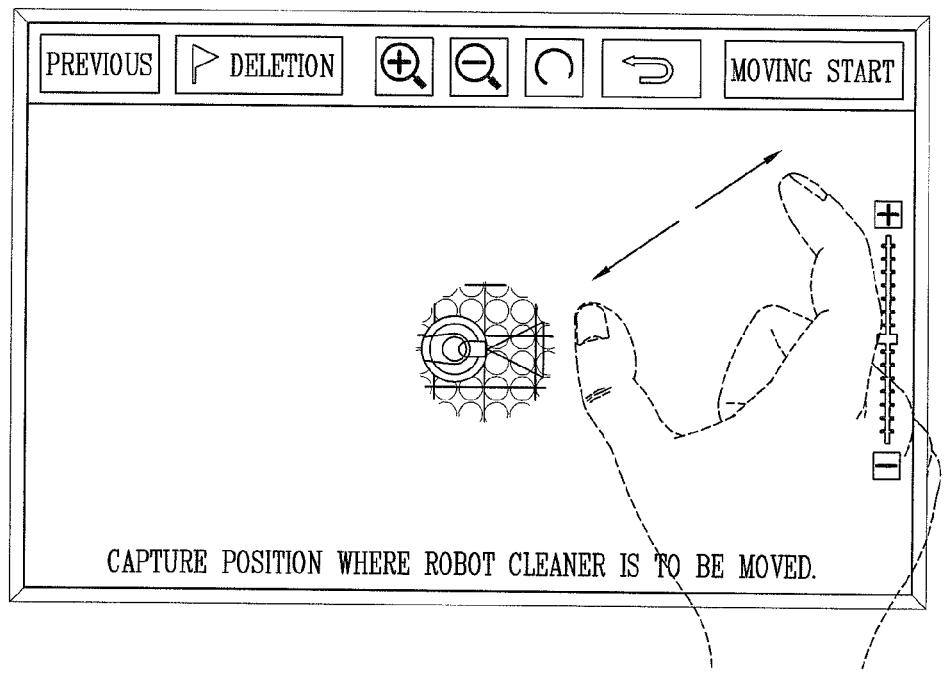
Figure 42:
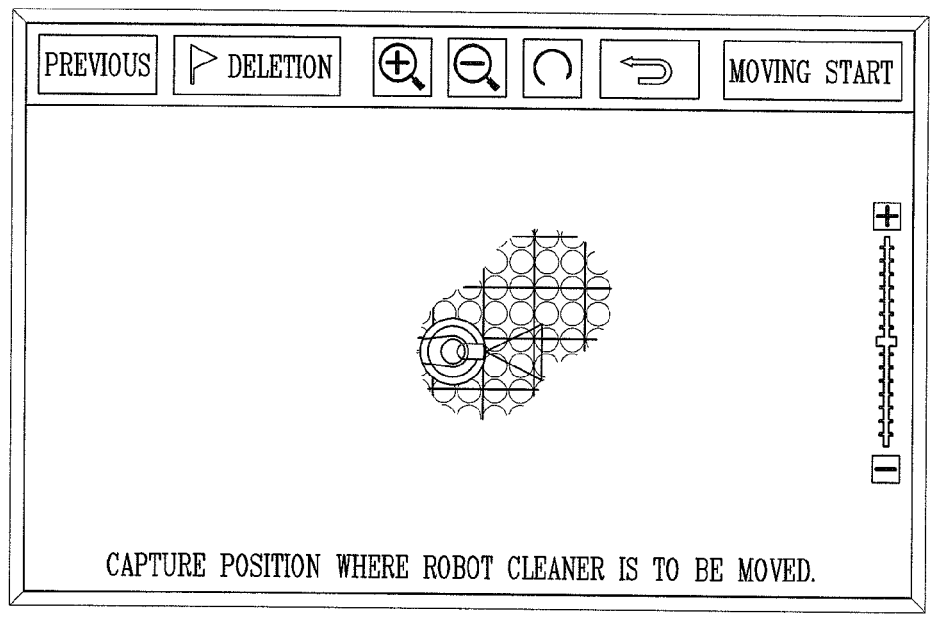
Figure 43:
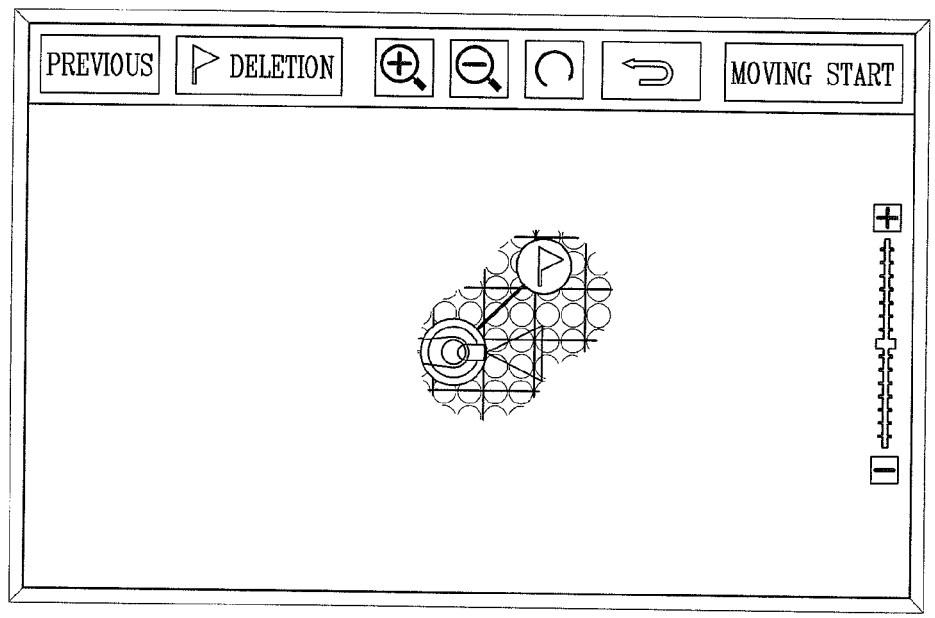
Figure 44:
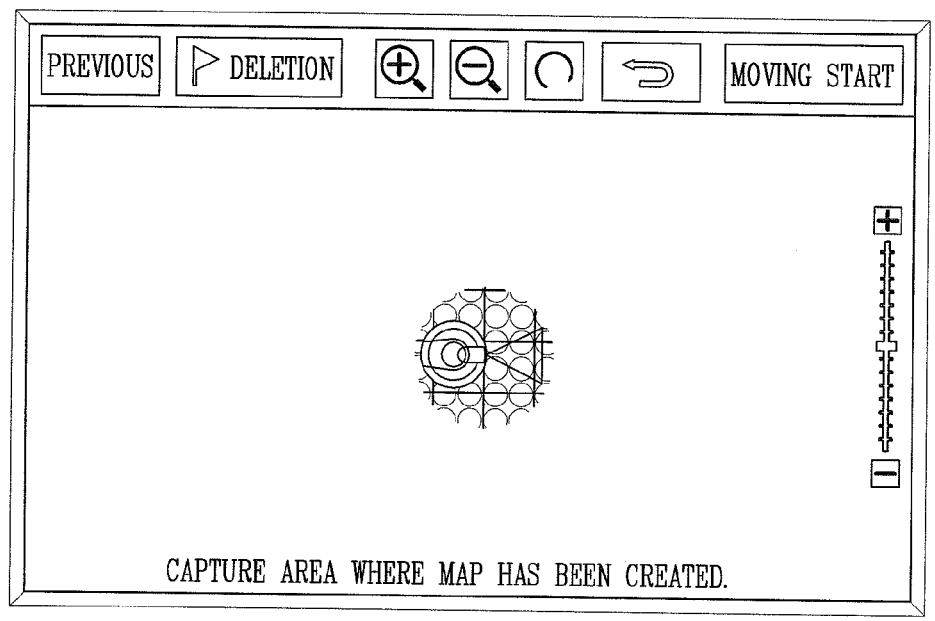

As shown in FIGS. 39 to 44, the robot cleaner may create a map while patrolling or moving. The terminal may display, on the screen, the operation to create a map by the robot cleaner. As shown in FIG. 39, if a user applies a patrol start command to the terminal, the display unit displays a message on the screen so that moving points (patrol points) can be set on the map. In a state where no map has been created, the robot cleaner may create a map while moving, and then may transmit the created map to the terminal. As shown in FIGS. 41 to 44, the display unit displays the map created by the robot cleaner. Once a user sequentially touches predetermined points on the map, the controller sets a moving path or a patrol path by connecting the points to each other.

Figure 45:
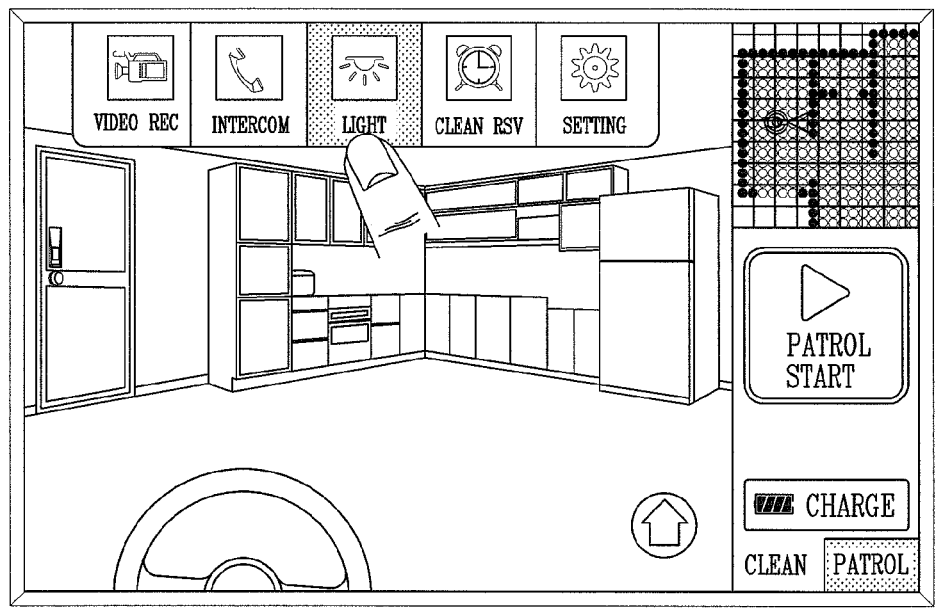
FIGS. 45 to 49 are views showing a screen of a terminal, for explaining an operation to control a light of a robot cleaner.
Figure 46:
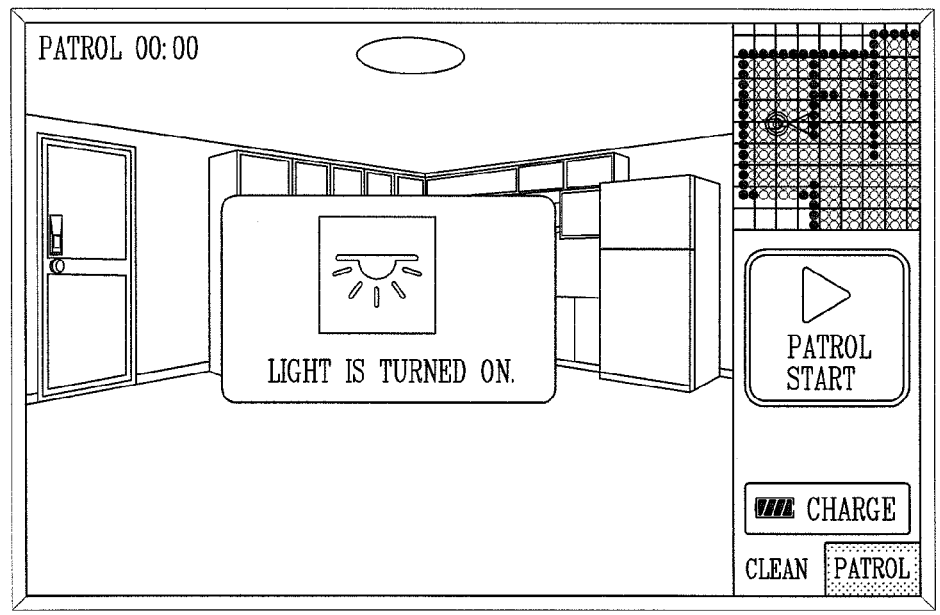
Figure 47:
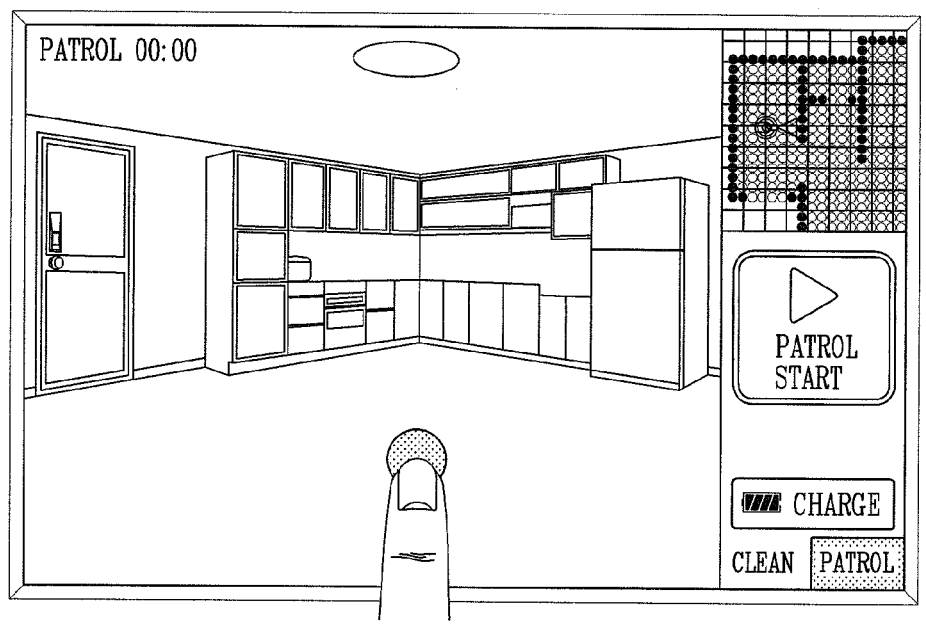
Figure 48:
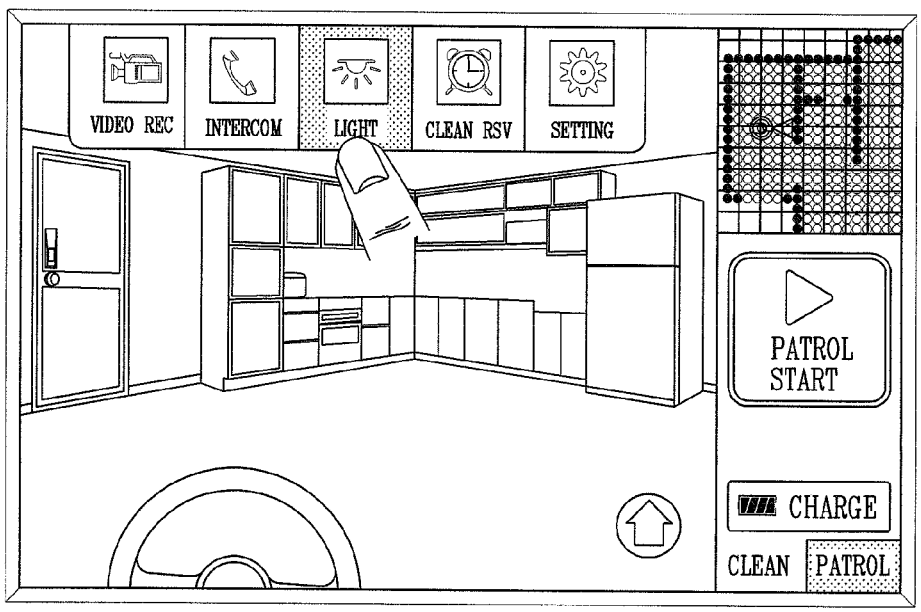
Figure 49:
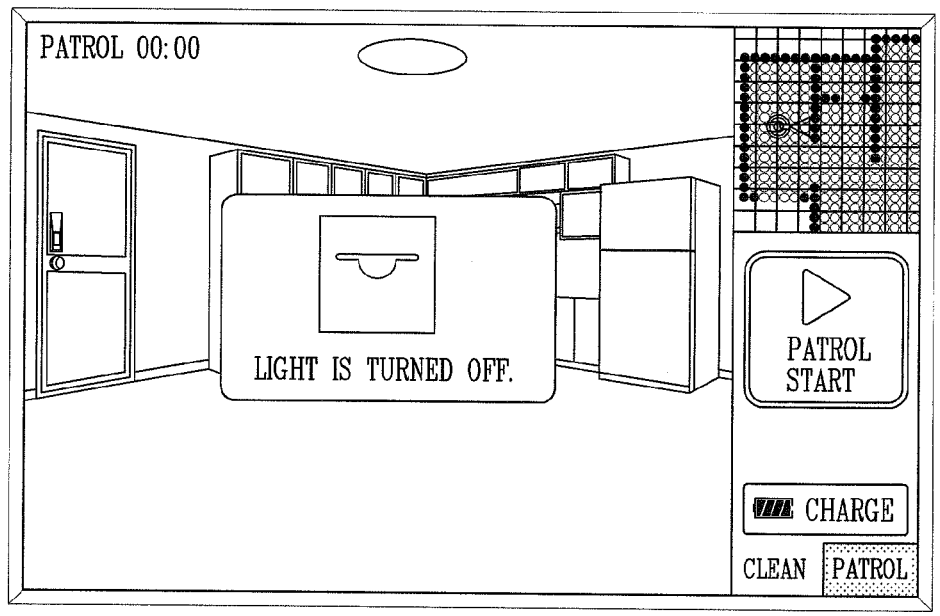

Referring to FIG. 45, the terminal receives a control command for turning on or off power of a light provided in the robot cleaner, and the controller creates a control signal. As shown in FIG. 45, an icon with respect to a light control command, may be provided in an option menu. If a user touches a light icon, the light icon may be toggled and the display unit may display, on the screen, a message such as "Light is turned on.", and "Light is turned off." as shown in FIG. 46 or 49. As shown in FIG. 47 or 48, the display unit may display image information after the light is turned on or off.

Figure 50:
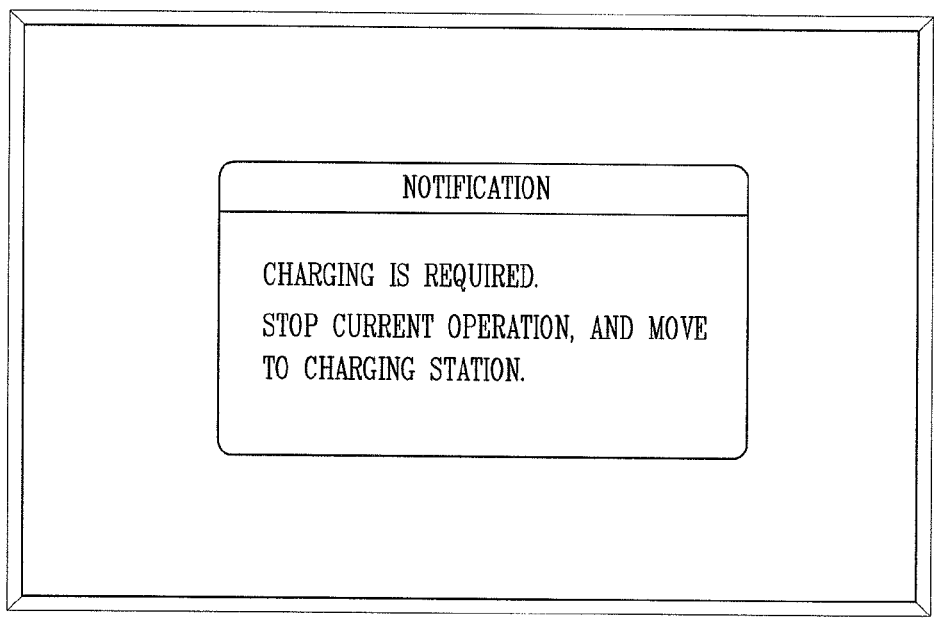
FIGS. 50 to 53 are views c automatically perform a charging operation while a robot cleaner patrols.
Figure 51:
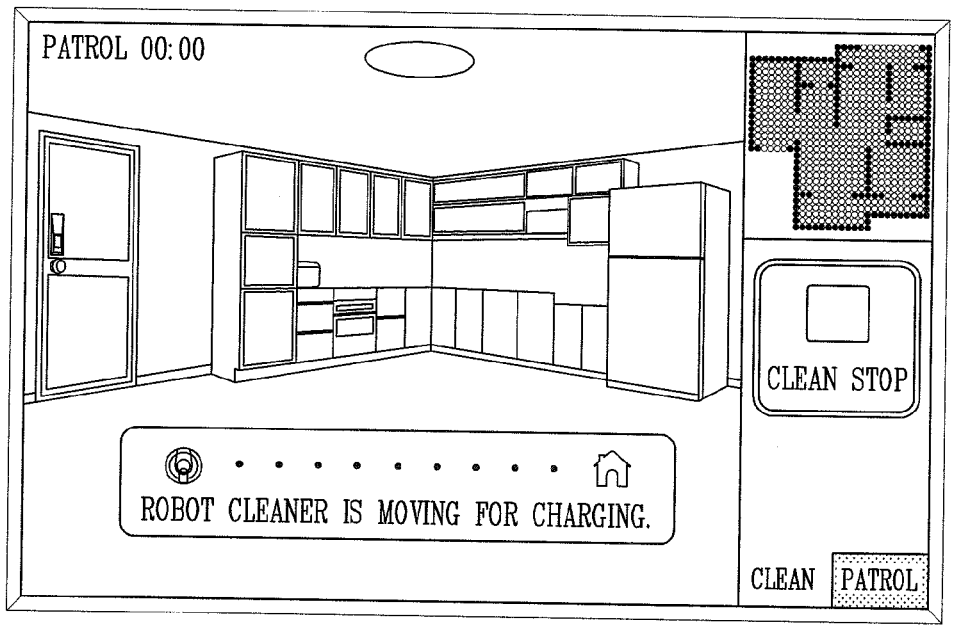
Figure 52:
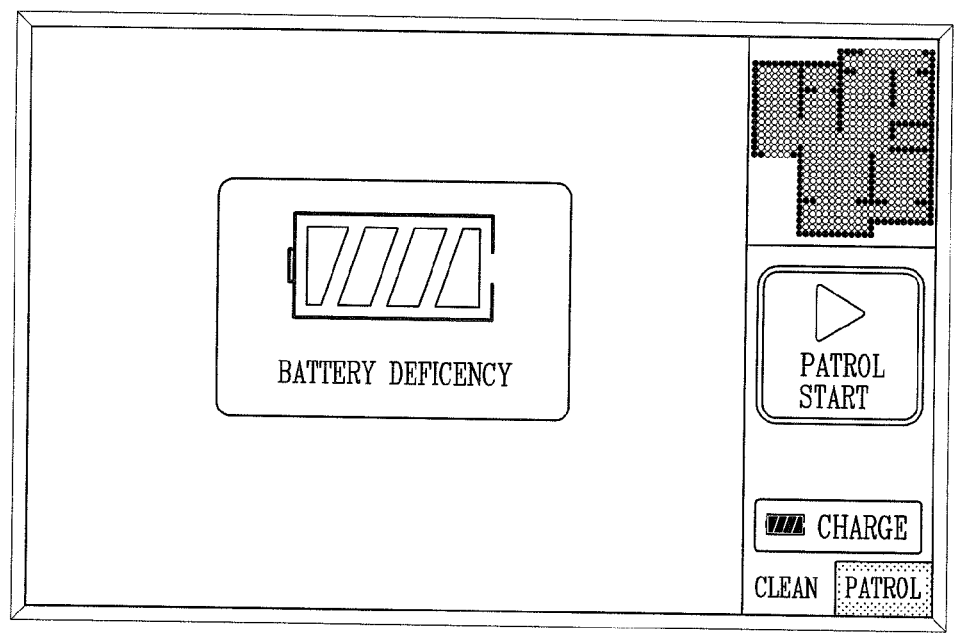
Figure 53:
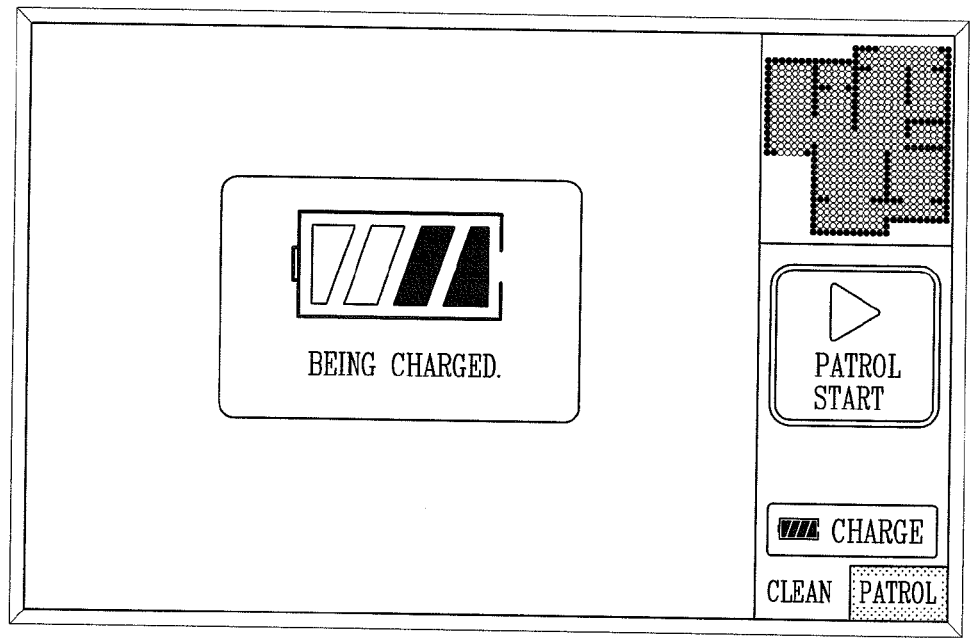

Referring to FIGS. 50 to 53, the robot cleaner may sense a charged state of the battery while patrolling (S271), and then move to a charging station (S281) to perform a charging operation (S282) according to sensing information. As shown in FIG. 50, the display unit may display a message such as "Charging is required." and "Stop the current operation and move to charging station." And, the radio communication unit may real-time receive state information from the robot cleaner (S273), and then the display may display a message such as "The robot cleaner is moving for charging.", "The remaining amount of battery is deficient." and "The robot cleaner is being charged." (S290).

Figure 54:
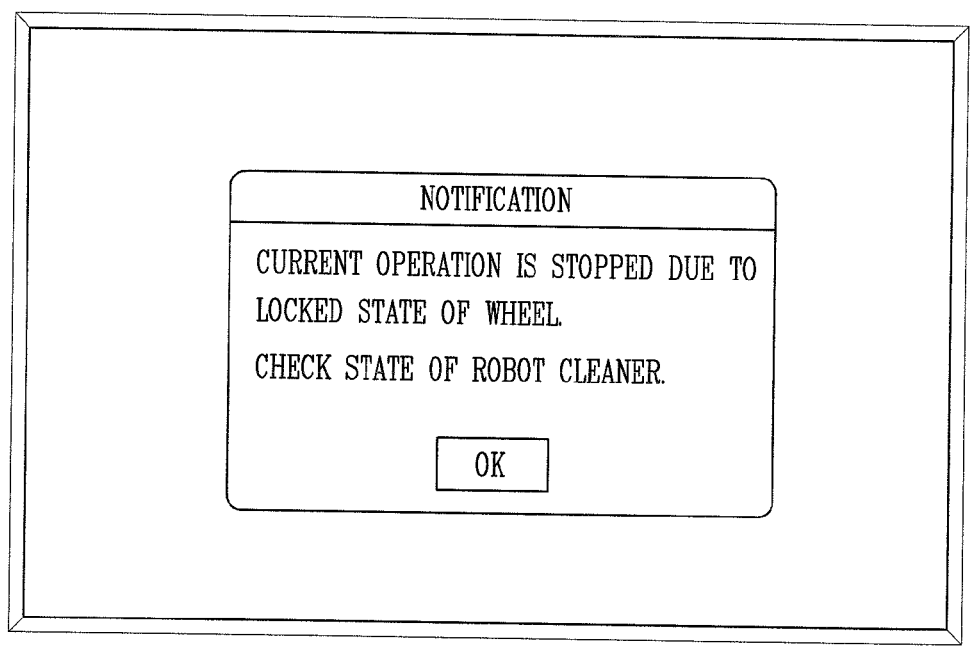
FIG. 54 is a view showing a screen of a terminal, the screen displaying a wheel locked state while the robot cleaner patrols.

As shown in FIG. 54, if an error such as a wheel locked state occurs while the robot cleaner moves or patrols, the terminal receives an error message thus to create a control screen. Then, the terminal displays the crated control screen. If a user touches (clicks) an OK button, the display unit may re-display the previous screen.

Figure 70:
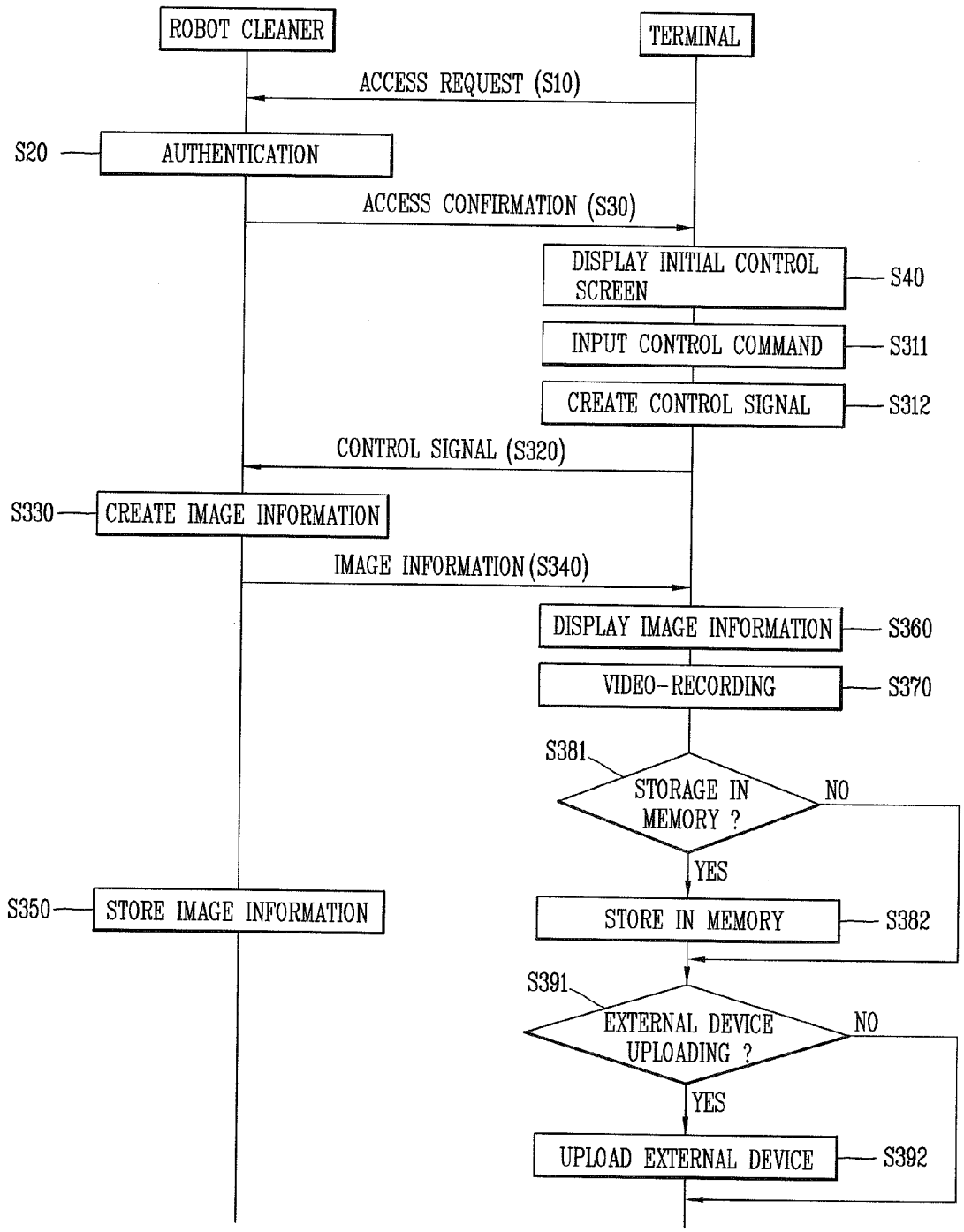

Referring to FIG. 70, a method for remotely controlling a robot cleaner according to another embodiment of the present disclosure, includes a robot cleaner's creating image information by capturing the periphery (S330), the robot cleaner's transmitting the image information to a terminal (S340), the terminal's displaying the image information on a screen (S360), and the terminal's video-recording the image information for a predetermined time (S370). The image information may be stored in a storage unit provided in the robot cleaner.

The terminal receives a control command, and creates a control signal corresponding to the control command (S311, S312). The control command includes a cleaning start command, a cleaning stop command, a moving command, a patrol start command, a patrol stop command, a charging command, a setting change, etc. Once a user inputs a control command by touching a cleaning start command or a cleaning stop command (S311), the terminal creates a control signal in correspondence to a communication protocol (S312), and transmits the control signal to the robot cleaner through a network (S320). The robot cleaner extracts a control command included in the control signal, and starts cleaning according to the cleaning start command, or stops the cleaning according to the cleaning stop command. The robot cleaner moves according to a moving command or a patrol command included in the control signal. The robot cleaner creates image information by capturing the periphery (S330), and transmits the image information to the terminal (S340). And, the terminal displays the image information on the screen of a display unit (S360). The robot cleaner senses an obstacle, and recognizes its position, thereby creating a map based on information on the sensed obstacle and position. The terminal video-records the image information received from the robot cleaner for a preset time (S370). The terminal stores the video-recorded image information in a memory mounted therein (S381, S382). As another example, the terminal may access an external device, such as a database server, a cloud server and a web server, through a radio communication unit, and may upload the video-recorded image information (S391, S392).

Figure 55:
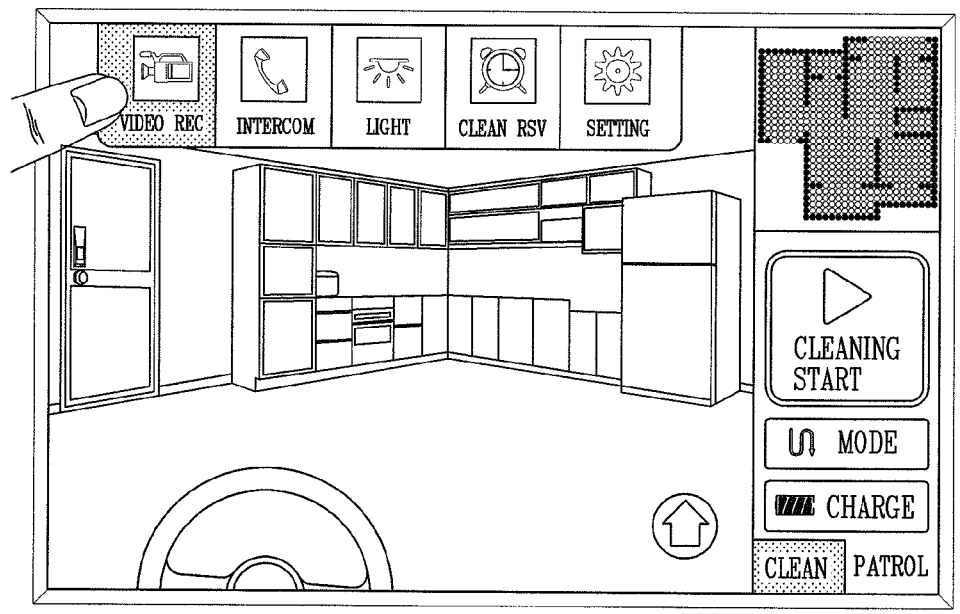
FIGS. 55 to 59 are views showing a screen of a terminal, for explaining an operation to video-record image information.
Figure 56:
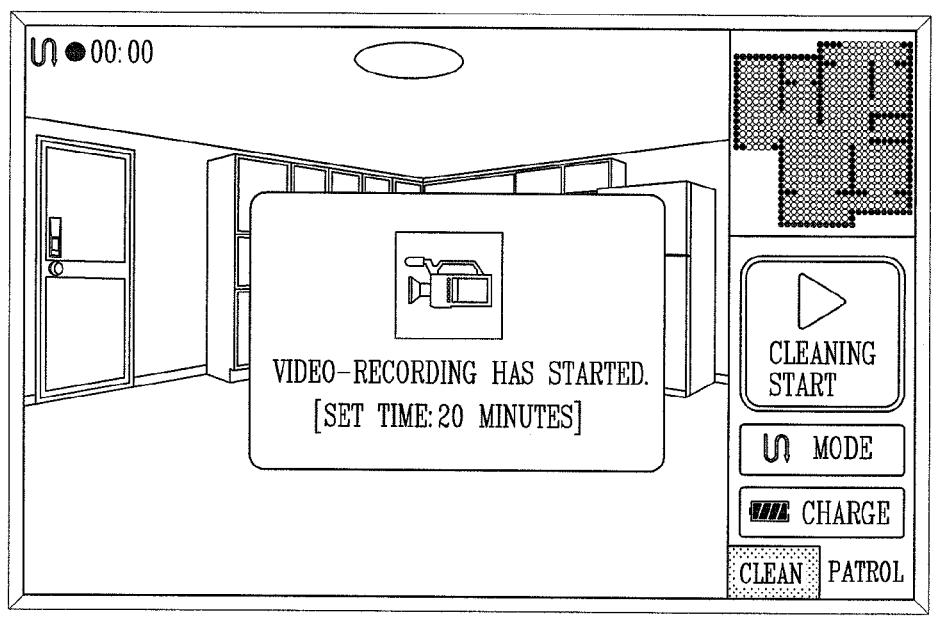
Figure 57:
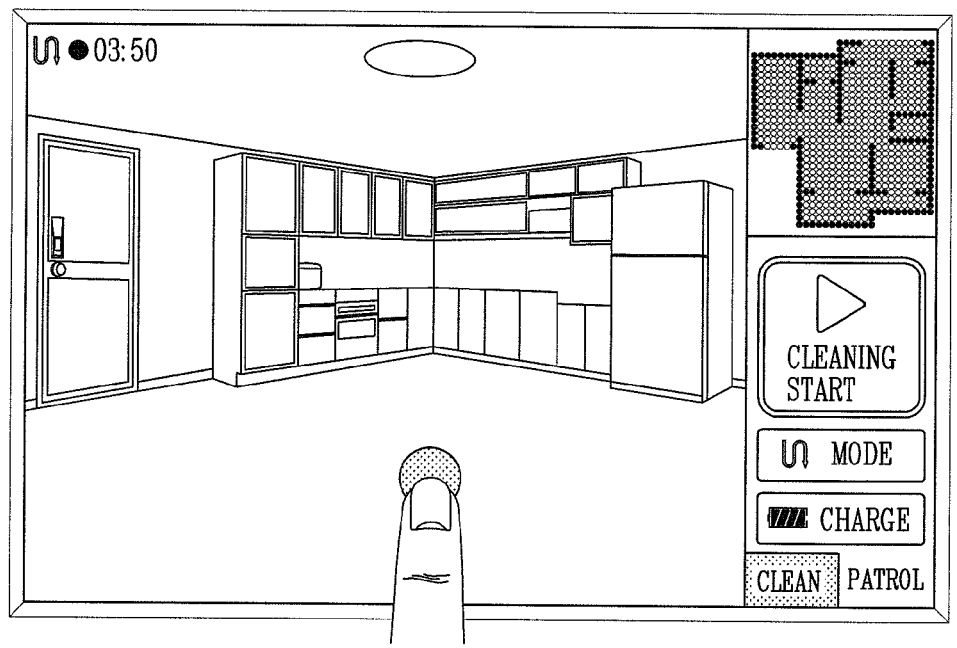
Figure 58:
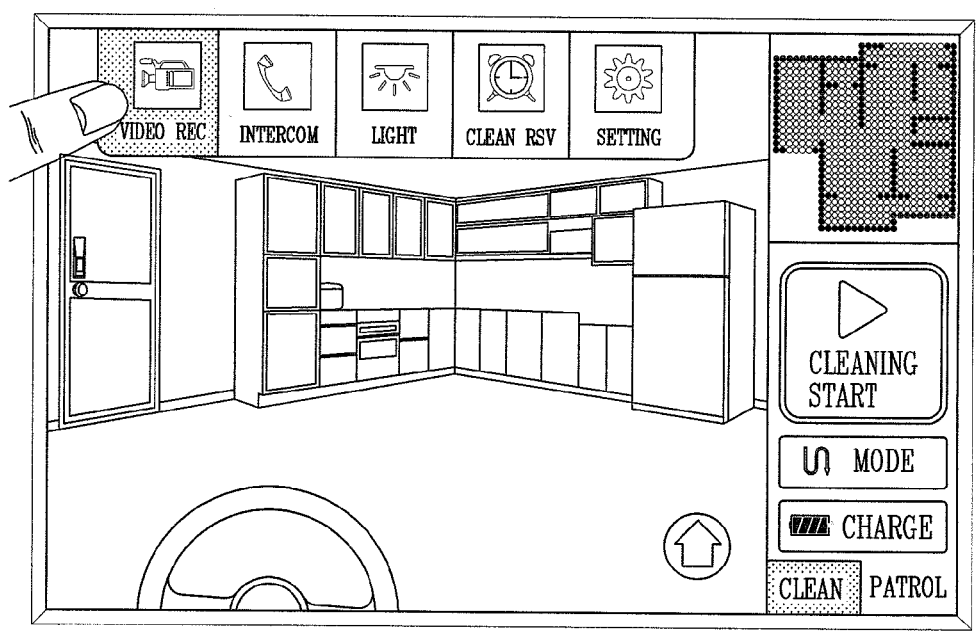
Figure 59:
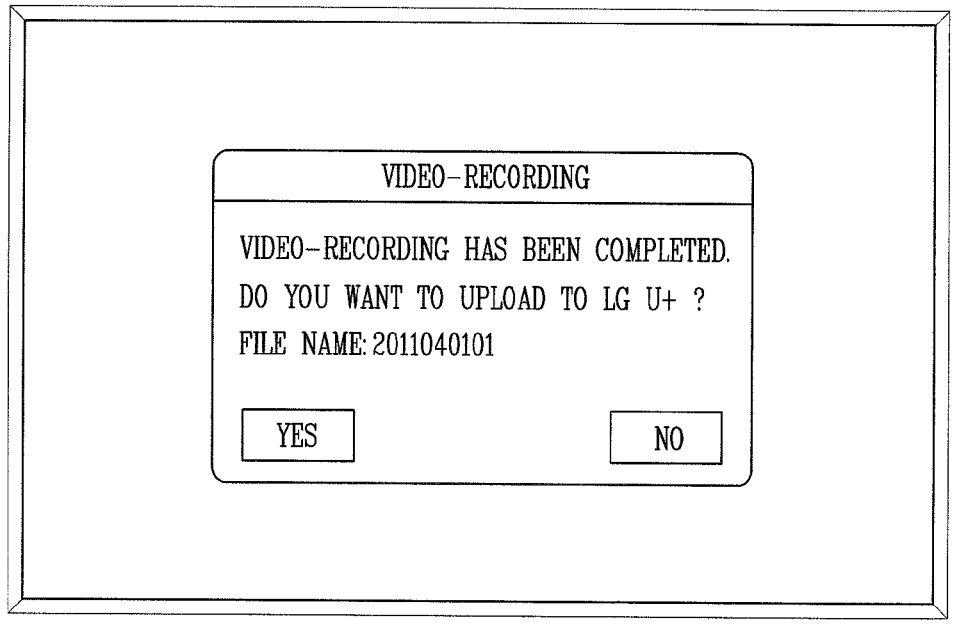

Referring to FIG. 55, if a touch input is applied to the first region while the robot cleaner performs a control command or while the robot cleaner is in a standby state, the display unit displays an option menu. The configuration of the option menu may be variable according to a design. For instance, as shown in FIG. 55, the option menu may include menus such as video-recording, interphone, lighting, cleaning reservation and setting. The display unit may further display an icon for enabling a manual operation of the robot cleaner. Once a cleaning command is input through a manual operation, the terminal creates a control signal and transmits the control signal to the robot cleaner. Referring to FIG. 55, if a video-recording icon is touched by a user, the terminal starts to perform video-recording. Referring to FIG. 56, the display unit displays video-recording being currently performed as an icon, and displays, on the screen, a message that "Video-recording has started.". The display unit may further display a setting time. Referring to FIG. 57, if a user touches the screen of the display unit while image information is being video-recorded, the terminal re-displays an option menu. Referring to FIG. 58, if a user re-touches a video-recording icon, the terminal completes the video-recording. Referring to FIG. 59, the display may display, on the screen, a message indicating completion of the video-recording.

Figure 60:
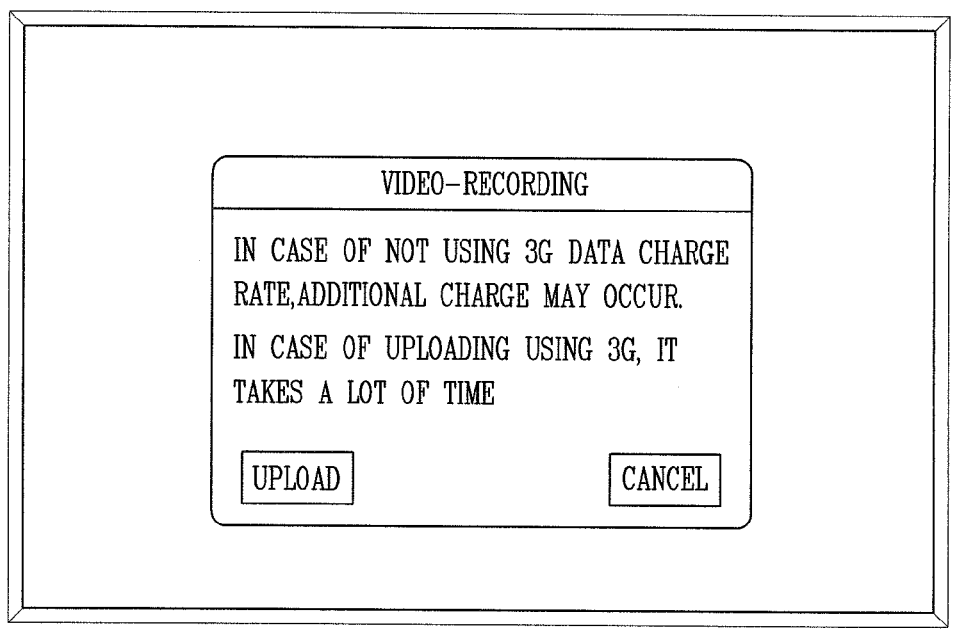
FIGS. 60 and 61 are views showing a screen of a terminal, for explaining an operation to store a video-recorded image in a memory.
Figure 61:
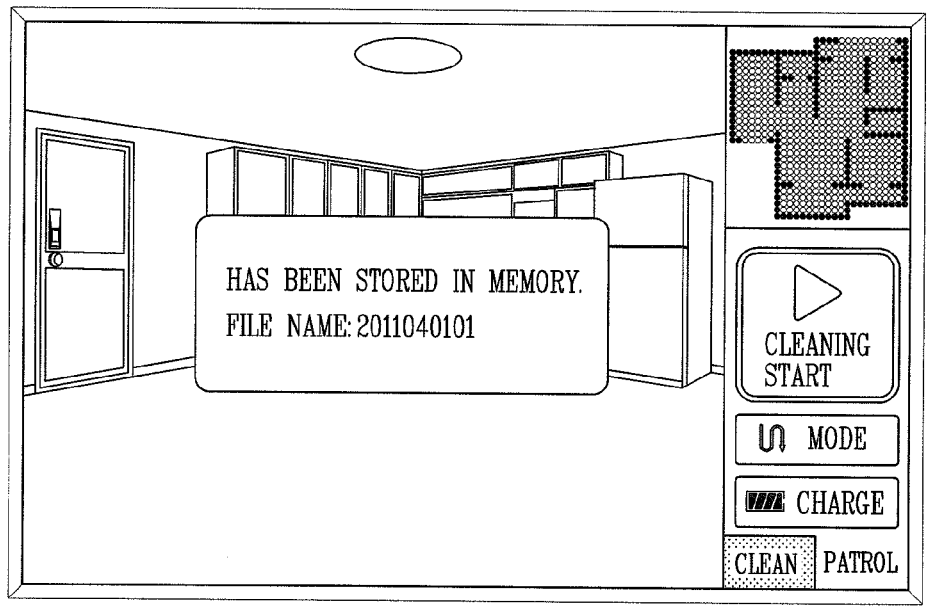
Figure 62:
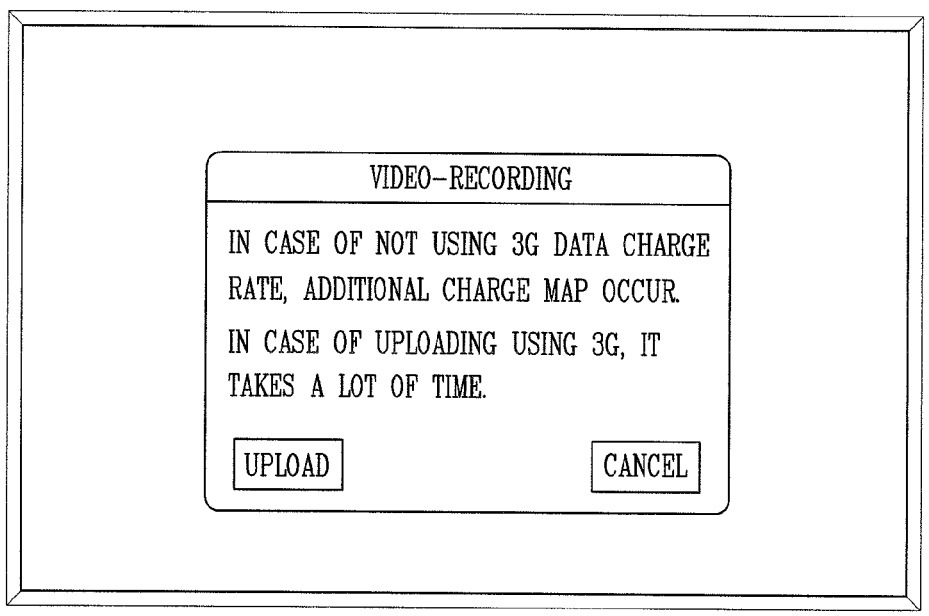
FIGS. 62 to 64 are views showing a screen of a terminal, for explaining an operation to upload a video-recorded image to an external storage device.
Figure 63:
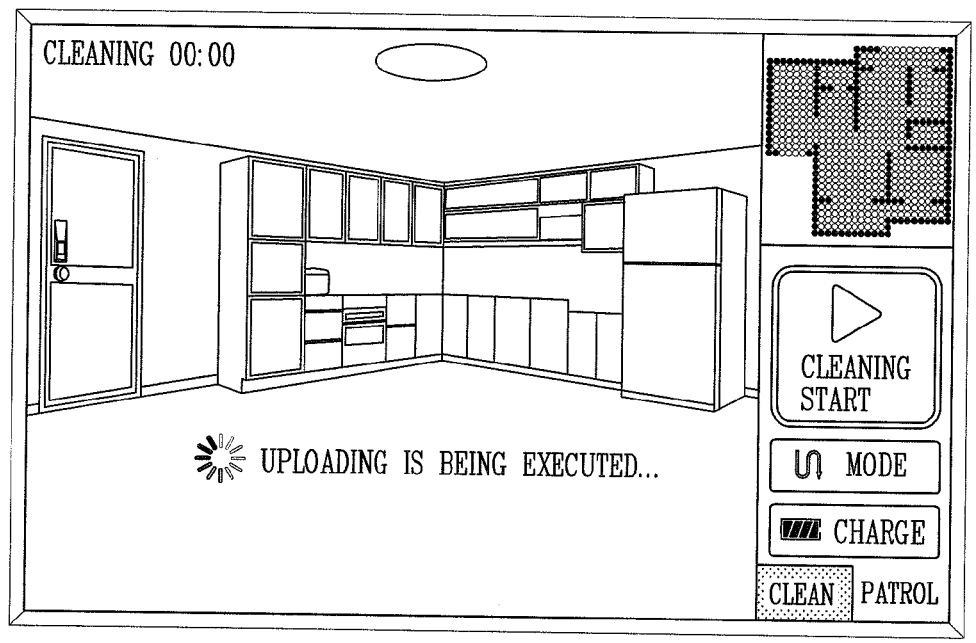
Figure 64:
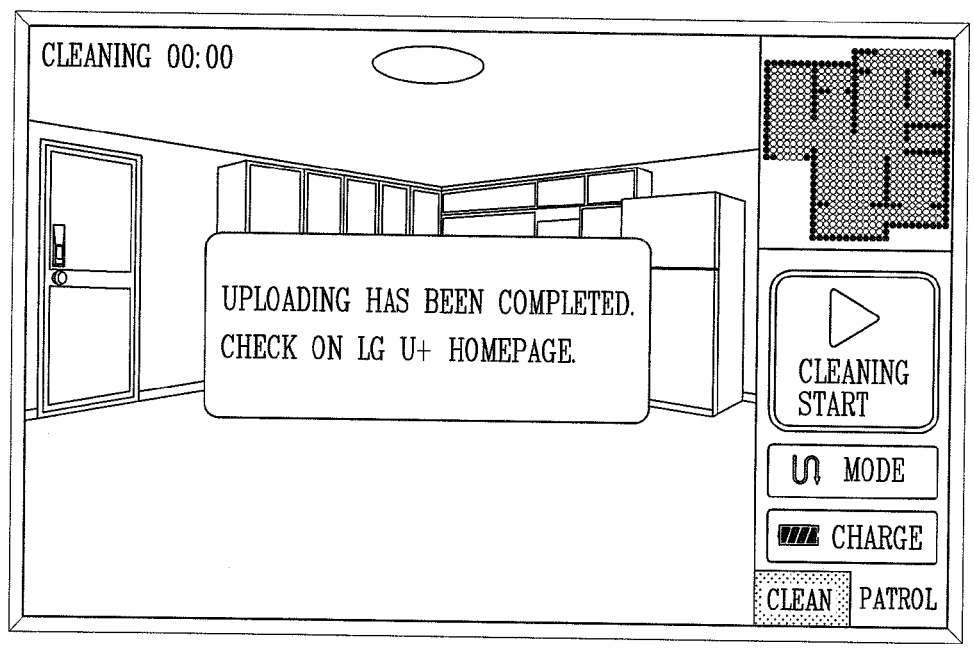

Referring to FIGS. 60 and 61, upon completion of the video-recording, the display unit may display, on the screen, a message inquiring an external storage device whether to perform upload or not. If a user touches a 'CANCEL' button, video-recorded image information is stored in a memory (photo book, etc.). Referring to FIGS. 62 to 64, if a user inputs a command to perform uploading to an external storage device, the radio communication unit is accessed to the external storage device, and transmits video-recorded image information to the external storage device.

Figure 65:
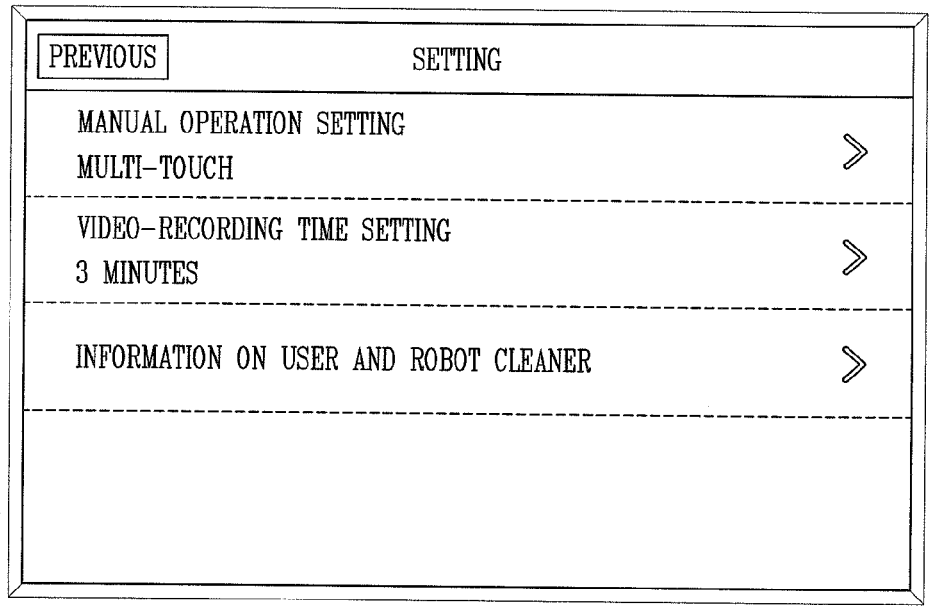
FIGS. 65 to 67 are views showing a screen of a terminal, for explaining setting of video-recording.
Figure 66:
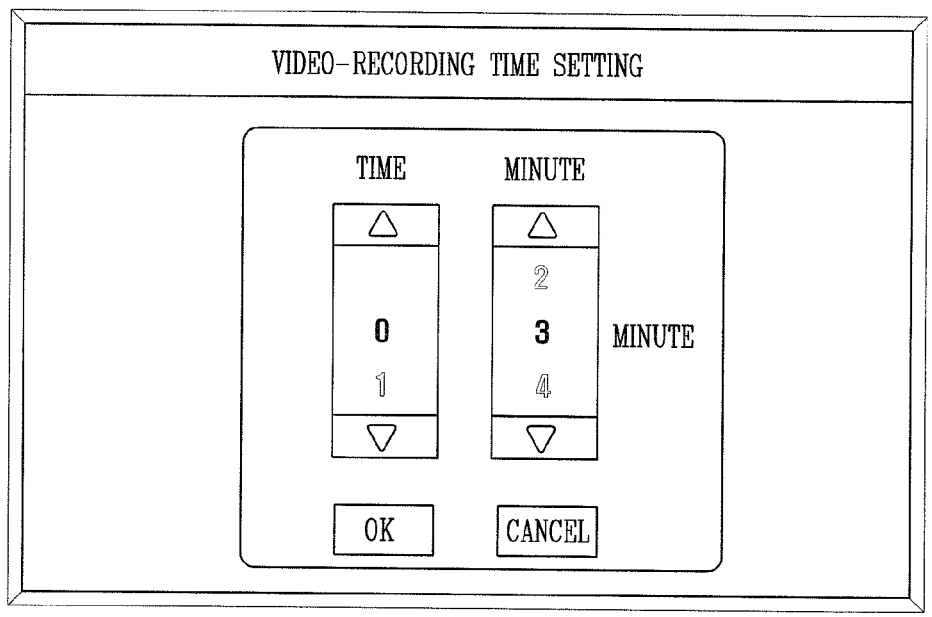
Figure 67:
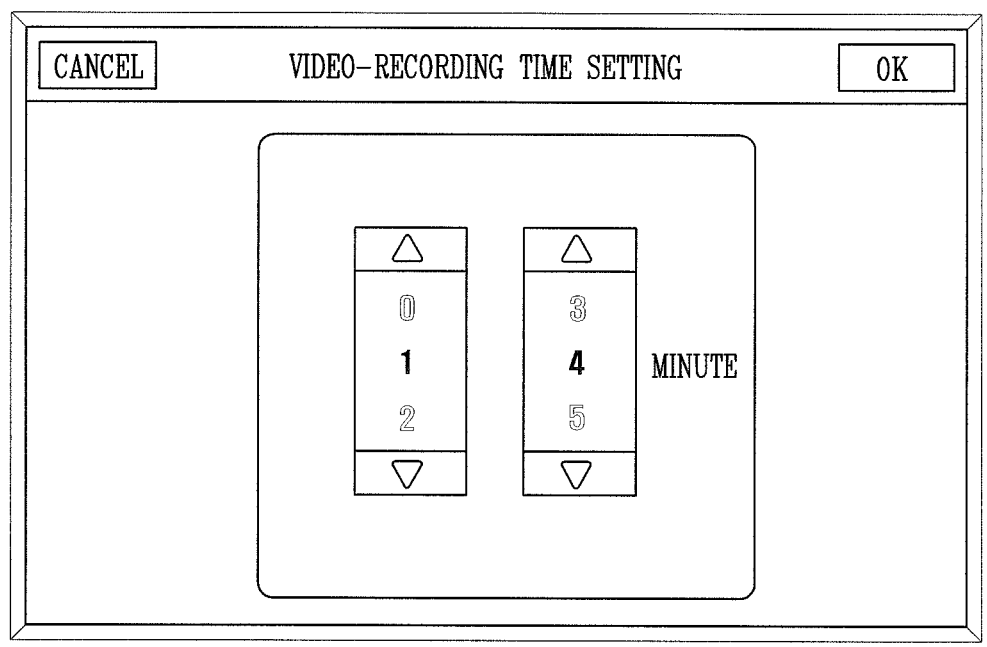

If a user touches a setting icon from the screen shown in FIG. 55, the display unit displays a setting screen shown in FIG. 65. Then, if a touch input with respect to a video-recording time is detected, the terminal displays, on the screen of the display unit, a video-recording time setting screen shown in FIG. 66 or 67.

Referring to FIG. 70, the method for remotely controlling a robot cleaner may further include the terminal's requesting for access to the robot cleaner (S10), the robot cleaner's authenticating the access (S20), the robot cleaner's approving and verifying the access to the terminal (S30), and the terminal's displaying an initial control screen (S40).

Once the terminal executes a remote control program for remotely controlling the robot cleaner, a log-in window for inputting log-in information on the robot cleaner is created. The remote control program may be pre-stored in a memory of the terminal, or may be downloaded from a server which stores therein a remote control program. In case of a smart phone, a remote control program is downloaded in the form of an application, and then is displayed on the screen of the display unit in the form of an icon, so that a user can execute the application by touching the icon. Once the user inputs log-in information, the terminal requests for access to the robot cleaner (S10). The robot cleaner may execute an authentication with respect to the log-in information, and the terminal may display, on the screen, a message informing that the terminal is accessing the robot cleaner.

The terminal may access one of a plurality of robot cleaners. The display unit displays a plurality of connectable robot cleaners, in the form of a list or icons. Once a user selects one of the plurality of robot cleaners, the selected robot cleaner executes an authentication with respect to the terminal.

After the authentication, the robot cleaner transmits an access confirmation signal to the terminal (S30), and the terminal displays an initial control screen (S40). The initial control screen may include an option menu, or may include data such as image information and a map. In the latter case, upon detection of a touch input to a first region, the display unit may display an option menu. And, the controller may control the display unit to temporarily display an option menu and then to display data on the initial control screen.

If log-in information is not consistent with pre-stored authentication information, the robot cleaner transmits an access non-acknowledgement signal to the terminal. Then, the terminal displays an error message such as 'ID or password is not correct. Please try again after check.'. Also, if a robot cleaner to be accessed has already accessed other terminal, or a robot cleaner to be accessed is being used by other user, the display unit may display an error message. The terminal may display a guide message according to a communication type. If a robot cleaner selected by a user has not been registered to a network, or has not accessed a network, the terminal may display an error message.

Figure 71:
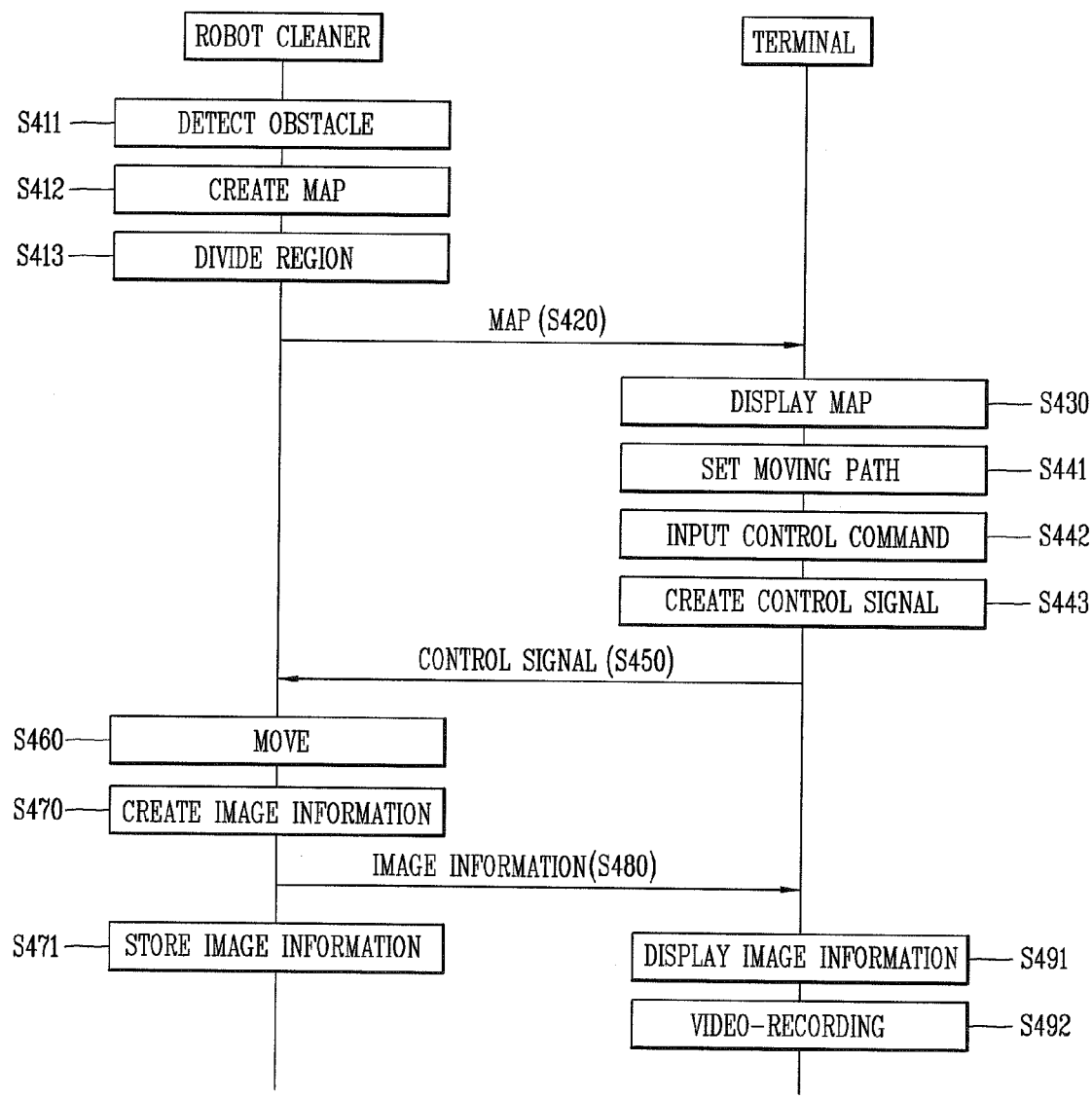

Referring to FIG. 71, the method for remotely controlling a robot cleaner may further include the robot cleaner's detecting a peripheral obstacle (S411), the robot cleaner's creating a map using obstacle information (S412), the robot cleaner's dividing a cleaning region into a cleaned region and a non-cleaned region (S413), and the robot cleaner's transmitting, to the terminal, a map on which the cleaning region is divided into the cleaned region and the non-cleaned region (S420). The method may further include the terminal's displaying the map (S430), and the terminal's receiving an input of a moving path on the map (S441).

If a user inputs, to the terminal, one of a patrol command, a moving command and a cleaning command, the robot cleaner executes the control command by receiving a control signal. While executing the control command, the robot cleaner detects an obstacle and transmits obstacle information to the terminal. The robot cleaner creates a map based on the obstacle information (S412), and transmits the created map to the terminal (S420). The robot cleaner may divide a cleaning region into a cleaned region and a non-cleaned region on the map while performing a cleaning operation (S413).

If a user touches a patrol start icon (or inputs a moving command) so that a patrol start command can be executed, the terminal may display a path setting screen on the display unit. If a user sequentially touches predetermined points on the map, the controller sets a moving path (patrol path) by connecting the points to each other (S441). A user may set a moving path or a patrol path by making the map displayed on the first region. Then, if a user touches a moving start icon or a patrol icon, the terminal creates a control signal based on a moving command or a patrol command (S443), and transmits the control signal to the robot cleaner (S450).

The robot cleaner moves according to the moving command or the patrol command included in the control signal (S460). The robot cleaner creates image information by capturing the periphery (S470), and transmits the image information to the terminal (S480). The terminal displays the image information on the screen of the display unit (S491). The robot cleaner may store the image information therein (S471). The terminal video-records the image information received from the robot cleaner for a prescribed time preset by the robot cleaner (S492). The terminal stores the video-recorded image information in a memory mounted therein, or may upload to an external storage device.

The robot cleaner may create a map while patrolling or moving. The terminal may display, on the screen, the operation to create the map by the robot cleaner. The robot cleaner may detect an image thus to transmit image information to the terminal, and the robot cleaner may create a map thus to transmit the created map to the terminal. In this case, the display unit may display the image information on the first region, and may display the map on the second region. If the first region is dragged to the second region, or if the second region is dragged to the first region, the display unit may display the image information and the map in a switching manner.

The present disclosure may have the following advantages.

Firstly, since the robot cleaner and the terminal are accessed to each other through a network, the robot cleaner can be controlled in more various manners.

Secondly, a situation inside a house can be real-time checked from the outside, and the satiation can be rapidly handled according to a state of the robot cleaner.

Thirdly, the robot cleaner can patrol a predetermined region or move to a user's desired location, and can provide, to the user through the terminal, images captured on a moving path or the user's desired location.

Fourthly, the robot cleaner can provide images of high quality, irrespective of the peripheral circumstances, owing to a lamp provided thereat.

Fifthly, the robot cleaner can perform a cleaning in an autonomous manner, or in a remote-controlled manner by the terminal, and can provide, to the terminal, image information captured during the cleaning. And, the terminal can video-record the image information.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A system for remotely-controlling a robot cleaner, the system comprising:
a robot cleaner configured to perform a control command by extracting the control command from a control signal, to move along a moving path based on the control command, and to create image information by capturing the periphery, to detect an obstacle information, and to create a map by using the obstacle information; and
a terminal configured to control the robot cleaner using the control signal, configured to receive one or more data including the image information from the robot cleaner, and to output the received data,
wherein the robot cleaner transmits the map to the terminal,
wherein the terminal includes:
a radio communication unit configured to transmit the control signal to the robot cleaner by accessing the robot cleaner, and to receive the image information from the robot cleaner;
a controller configured to create the control signal corresponding to the control command, and to create a control screen using the image information;
a display unit having a touch recognition region for receiving an input of the control command, and configured to display the control screen, wherein the control signal is created at the terminal while the display unit displaying the transmitted image information, wherein the radio communication unit receives, from the robot cleaner, the map divided into a cleaned region and a non-cleaned region, wherein if a touch input applied to one or more points on the map is sensed, the controller sets the moving path using said one or more points, and wherein the touch recognition region includes an image information region and a map region, wherein the image information is displayed in the image information region, and the map is displayed in the map region, wherein if the image information region having been touched is dragged to the map region, or if the map region having been touched is dragged to the image information region, data displayed on the image information region is switched from data displayed on the map region.

2. The system of claim 1, wherein the terminal further includes:

a memory configured to store the image information therein.

3. The system of claim 2, wherein the touch recognition region includes:

a first region having a preset size, on which the control screen is displayed and the control command is input; and a second region having a size equal to or larger than the size of the first region.

4. The system of claim 2, wherein the display unit further includes a light icon for turning on or off power of a light of the robot cleaner.

5. The system of claim 2, wherein the moving path is a patrol path connected to the current position of the robot cleaner, and wherein the moving command includes a patrol command for moving the robot cleaner along the patrol path.

6. The system of claim 2, wherein the controller sets a prescribed time, video-records the image information for the preset time, and stores the video-recorded image information in the memory.

7. The system of claim 6, wherein the radio communication unit is accessed to an external storage unit, and transmits the video-recorded image information to the external storage unit for storage.

8. The system of claim 2, wherein the terminal is configured to display the map and receive an input of a moving path on the map.

* * * * *